United States Patent
Wei et al.

(10) Patent No.: US 11,878,242 B2
(45) Date of Patent: Jan. 23, 2024

(54) METHOD AND APPARATUS FOR DISPLAYING VIRTUAL ENVIRONMENT PICTURE, DEVICE, AND STORAGE MEDIUM

(71) Applicant: Tencent Technology (Shenzhen) Company Limited, Shenzhen (CN)

(72) Inventors: Jiacheng Wei, Shenzhen (CN); Xun Hu, Shenzhen (CN); Shandong Su, Shenzhen (CN); Xiangyu Zhang, Shenzhen (CN); Yong Zhang, Shenzhen (CN); Kang Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 320 days.

(21) Appl. No.: 17/516,514

(22) Filed: Nov. 1, 2021

(65) Prior Publication Data
US 2022/0047945 A1 Feb. 17, 2022

Related U.S. Application Data

(63) Continuation of application No. PCT/CN2021/080291, filed on Mar. 11, 2021.

(30) Foreign Application Priority Data

Apr. 9, 2020 (CN) .......................... 202010275544.4

(51) Int. Cl.
*A63F 13/5258* (2014.01)
*A63F 13/573* (2014.01)

(52) U.S. Cl.
CPC ........ *A63F 13/5258* (2014.09); *A63F 13/573* (2014.09); *A63F 2300/30* (2013.01)

(58) Field of Classification Search
CPC ................ A63F 13/5258; A63F 13/573; A63F 2300/30; A63F 13/2145; A63F 13/426;
(Continued)

(56) References Cited

U.S. PATENT DOCUMENTS 6,835,136 B2 * 12/2004 Kitao ...................... A63F 13/57
463/43
7,806,767 B2 * 10/2010 Kitao ...................... A63F 13/10
463/31
(Continued)

FOREIGN PATENT DOCUMENTS

| CN | 107168611 A | 9/2017 |
| CN | 107754308 A | 3/2018 |

(Continued)

OTHER PUBLICATIONS

Tencent Technology, ISR, PCT/CN2021/080291, Jun. 10, 2021, 3 pgs.
(Continued)

*Primary Examiner* — Pierre E Elisca
(74) *Attorney, Agent, or Firm* — Morgan, Lewis & Bockius LLP

(57) ABSTRACT

This application discloses a method for displaying a virtual environment picture performed by a computer device. The method includes: displaying a first virtual environment picture obtained by observing a virtual environment by using a first observation position; displaying, in response to receiving a first directional instruction generated by a first directional operation, a directional skill indicator pointing to a first direction; and in accordance with a determination that a length of the directional skill indicator is greater than a distance threshold in the first virtual environment picture, displaying a second virtual environment picture obtained by observing the virtual environment by using a second observation position, the second virtual environment picture
(Continued)

including the directional skill indicator, and the second observation position being in the first direction of the first observation position or in a surrounding region in the first direction.

20 Claims, 21 Drawing Sheets

(58) Field of Classification Search
CPC ........ A63F 13/655; A63F 13/92; A63F 13/35; A63F 13/56; A63F 13/57; A63F 13/822; A63F 13/847; A63F 2300/807
USPC .......................................................... 463/33
See application file for complete search history.

(56) References Cited

U.S. PATENT DOCUMENTS

| | | | |
|---|---|---|---|
| 2001/0024972 A1* | 9/2001 | Kitao | A63F 13/5258 463/33 |
| 2005/0049047 A1* | 3/2005 | Kitao | A63F 13/45 463/33 |
| 2006/0040738 A1* | 2/2006 | Okazaki | A63F 13/45 463/32 |
| 2010/0273544 A1 | 10/2010 | Koganezawa | |
| 2012/0001944 A1 | 1/2012 | Sakurai et al. | |
| 2015/0157940 A1 | 6/2015 | Hall | |
| 2019/0174121 A1 | 6/2019 | Asakura | |
| 2019/0374855 A1 | 12/2019 | Johnston et al. | |
| 2021/0339138 A1 | 11/2021 | Shao et al. | |
| 2021/0370170 A1 | 12/2021 | Li | |

FOREIGN PATENT DOCUMENTS

| | | |
|---|---|---|
| CN | 107913520 A | 4/2018 |
| CN | 109675308 A | 4/2019 |
| CN | 109847354 A | 6/2019 |
| CN | 109966738 A | 7/2019 |
| CN | 110613933 A | 12/2019 |
| CN | 111467802 A | 7/2020 |
| CN | 111603770 A | 9/2020 |
| JP | 2010252932 A | 11/2010 |

OTHER PUBLICATIONS

Tencent Technology, WO, PCT/CN2021/080291, Jun. 10, 2021, 4 pgs.
Tencent Technology, IPRP, PCT/CN2021/080291, Oct. 6, 2022, 5 pgs.
Tencent Technology, Singapore Office Action, SG Patent Application No. 11202111499R, dated Apr. 7, 2023, 14 pgs.
Soybean Phenomenon, "Addition of date skill direction indicator | Geosang Taseop review", YouTube, Aug. 28, 2018, 2 pgs., Retrieved from the Internet: https://www.youtube.com/watch?reload=9&app=desktop&v=-4aPja6pfOI.
Tencent Technology, Korean Office Action, KR Patent Application No. 10-2021-7034447, dated Sep. 4, 2023, 11 pgs.
Tencent Technology, Japanese Office Action, JP Patent Application No. 2021-564608, dated May 29, 2023, 5 pgs.
Tencent Technology, JP Office Action, Japanese Patent Application No. 2021-564608, dated Dec. 5, 2022, 7 pgs.

* cited by examiner

| Display a first virtual environment picture, the first virtual environment picture being a picture obtained by observing a virtual environment by using a first observation position as an observation center, the first virtual environment picture displaying a master virtual character located in the virtual environment | 201 |

| Display, in response to receiving a first directional instruction generated by a first directional operation, a directional skill indicator pointing to a first direction, the directional skill indicator being a directional identifier that uses a position of the master virtual character as a starting point and that points to the first direction | 202 |

| When a length of the directional skill indicator is greater than a distance threshold in the first virtual environment picture, display a second virtual environment picture, the second virtual environment picture being a picture obtained by observing the virtual environment by using a second observation position as an observation center, the second virtual environment picture including the directional skill indicator, and the second observation position being in the first direction of the first observation position or in a surrounding region in the first direction | 203 |

FIG. 2

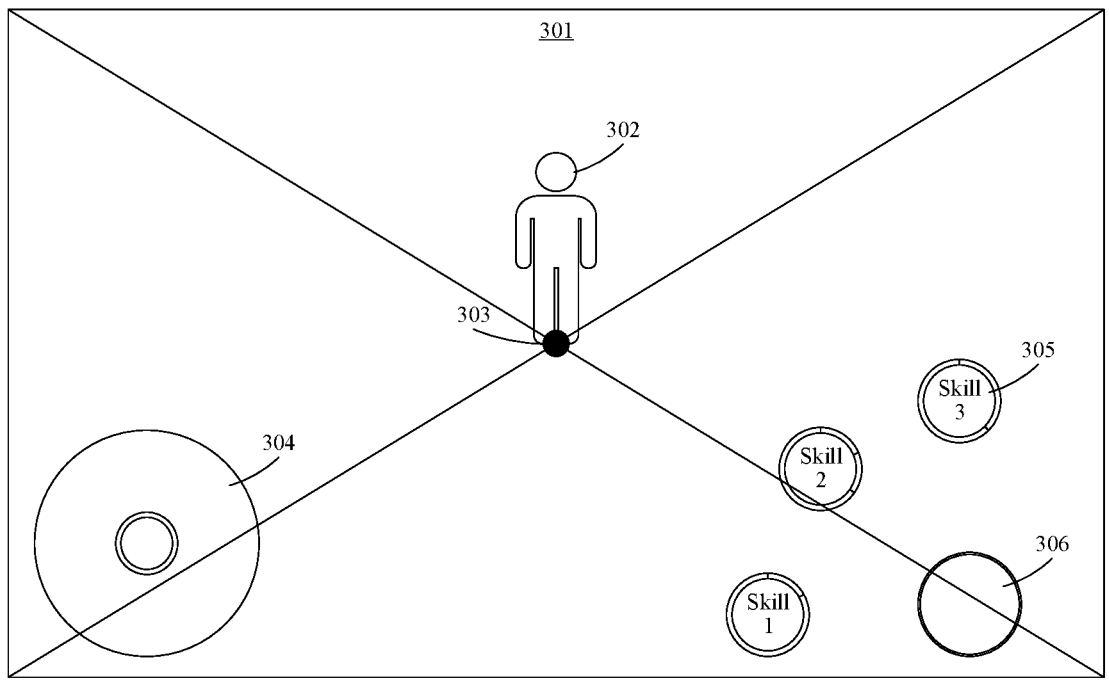

FIG. 3

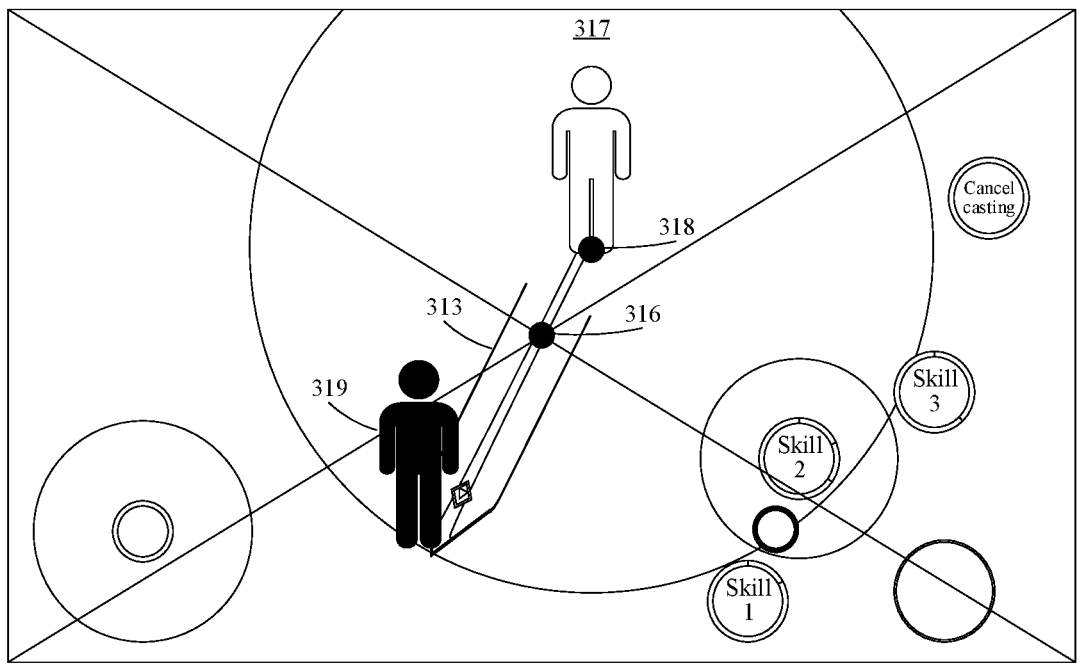

FIG. 10

| Display a first virtual environment picture, the first virtual environment picture being a picture obtained by observing a virtual environment by using a first observation position as an observation center, the first virtual environment picture displaying a master virtual character located in the virtual environment | 201 |

| Display, in response to receiving a first directional instruction generated by a first directional operation, a directional skill indicator pointing to a first direction, the directional skill indicator being a directional identifier that uses a position of the master virtual character as a starting point and that points to the first direction | 202 |

| Display the second virtual environment picture in response to that a length of the directional skill indicator is greater than a distance threshold, the distance threshold being a visual field threshold that uses the position of the master virtual character as a starting point in the first virtual environment picture and that is in the first direction | 2031 |

FIG. 11

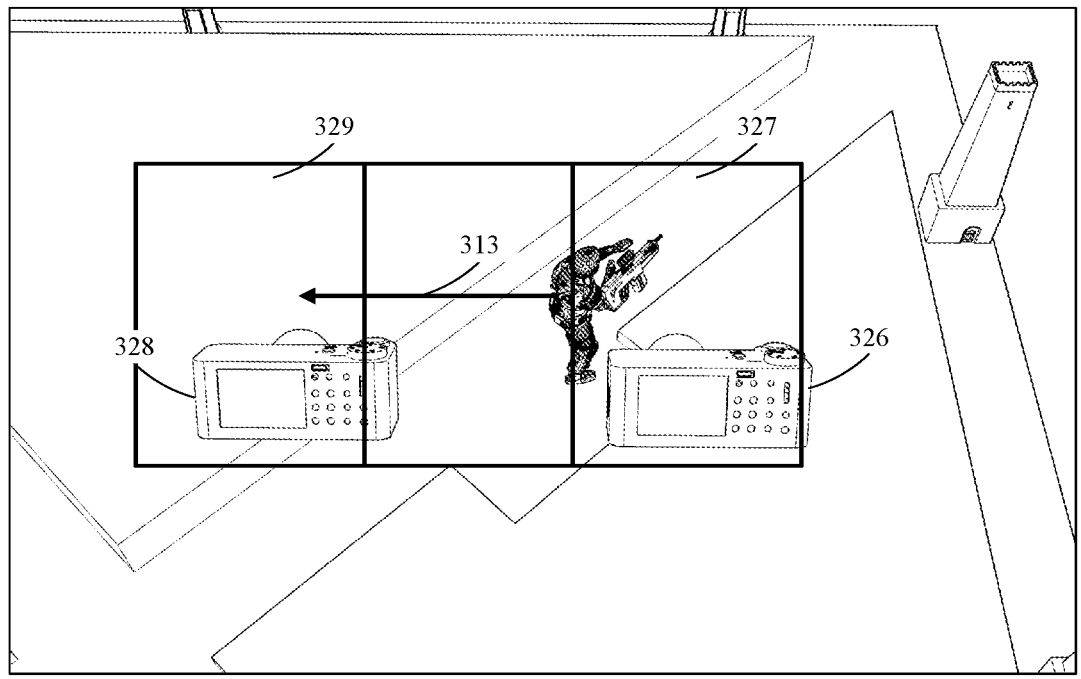

FIG. 14

| | |
|---|---|
| Display a first virtual environment picture, the first virtual environment picture being a picture obtained by observing a virtual environment by using a first observation position as an observation center, the first virtual environment picture displaying a master virtual character located in the virtual environment | 201 |
| Display, in response to receiving a first directional instruction generated by a first directional operation, a directional skill indicator pointing to a first direction, the directional skill indicator being a directional identifier that uses a position of the master virtual character as a starting point and that points to the first direction | 202 |
| Obtain an offset of a camera model in response to that the length of the directional skill indicator is greater than the distance threshold, the offset being used for determining a moving direction and a moving distance of the camera model | 2031-1 |
| Control, according to the offset, the camera model to move from the first camera position to the second camera position in a specified movement manner, the specified movement manner including any one of a uniform motion, a differential motion, and a smooth damped motion | 2031-21 |
| Display the second virtual environment picture according to the camera model at the second camera position, the second virtual environment picture including the directional skill indicator | 2031-3 |

FIG. 15

METHOD AND APPARATUS FOR DISPLAYING VIRTUAL ENVIRONMENT PICTURE, DEVICE, AND STORAGE MEDIUM

CROSS-REFERENCE TO RELATED APPLICATIONS

This application is a continuation application of PCT Patent Application No. PCT/CN2021/080291, entitled "METHOD AND APPARATUS FOR DISPLAYING VIRTUAL ENVIRONMENT PICTURE, DEVICE, AND STORAGE MEDIUM" filed on Mar. 11, 2021, which claims priority to Chinese Patent Application No. 202010275544.4, filed with the State Intellectual Property Office of the People's Republic of China on Apr. 9, 2020, and entitled "METHOD AND APPARATUS FOR DISPLAYING VIRTUAL ENVIRONMENT PICTURE, DEVICE, AND STORAGE MEDIUM", all of which are incorporated herein by reference in their entirety.

FIELD OF THE TECHNOLOGY

Embodiments of this application relate to the field of man-machine interaction, and in particular, to a method and apparatus for displaying a virtual environment picture, a device, and a storage medium.

BACKGROUND OF THE DISCLOSURE

A battle game is a game in which a plurality of user accounts compete in the same scene. Optionally, the battle game may be a multiplayer online battle arena (MOBA) game.

In a typical MOBA game, a virtual environment picture displayed on a client is a picture obtained by observing a virtual environment by using a master virtual character as an observation center. A user may control the master virtual character to cast a skill in a designated direction to attack an opponent virtual character in the designated direction. When the user controls the master virtual character to aim in the designated direction, a directional skill indicator is displayed on the virtual environment picture. The directional skill indicator is configured to show the user an action range of the skill to be cast. If the opponent virtual character is located in the action range indicated by the directional skill indicator, in this case, the user may control the master virtual character to cast the skill, and the master virtual character attacks the opponent virtual character.

When the skill of the master virtual character has a quite long action distance, the directional skill indicator may have a corresponding long length and therefore cannot be completely displayed on the virtual environment picture. As a result, the directional skill indicator cannot effectively help user to accurately aim at a target, and a plurality of targeting operations are required to aim at the target, resulting in a plurality of invalid operations performed by the client and computing resource waste.

SUMMARY

Embodiments of this application provide a method and apparatus for displaying a virtual environment picture, a device, and a medium. By changing an observation position of a virtual environment picture according to a direction indicated by a skill indicator, a directional skill indicator can be displayed more completely, thereby improving the accuracy of aiming at a target by a user. The technical solutions are as follows.

According to one aspect of this application, a method for displaying a virtual environment picture is provided. The method is performed by a client and includes:

displaying a first virtual environment picture, the first virtual environment picture being a picture obtained by observing a virtual environment by using a first observation position as an observation center, the first virtual environment picture displaying a master virtual character located in the virtual environment;

displaying, in response to receiving a first directional instruction generated by a first directional operation, a directional skill indicator pointing to a first direction, the directional skill indicator being a directional identifier that uses a position of the master virtual character as a starting point and that points to the first direction; and in accordance with a determination that a length of the directional skill indicator is greater than a distance threshold in the first virtual environment picture, displaying a second virtual environment picture, the second virtual environment picture being a picture obtained by observing the virtual environment by using a second observation position as an observation center, the second virtual environment picture including the directional skill indicator, and the second observation position being in the first direction of the first observation position or in a surrounding region in the first direction.

According to another aspect of this application, a computer device is provided, including a processor and a memory, the memory storing at least one program, the at least one program, being loaded and executed by the processor to implement the method for displaying a virtual environment picture described in the foregoing aspects.

According to another aspect of this application, a non-transitory computer-readable storage medium is provided, the computer-readable storage medium storing at least one program, the at least one program being loaded and executed by a processor of a computer device to implement the method for displaying a virtual environment picture described in the foregoing aspects.

The technical solutions provided in the embodiments of this application include at least the following beneficial effects:

By controlling an observation center to move in a direction pointed by a directional skill indicator, a master virtual character is no longer used as an observation center of a virtual environment picture, so that the directional skill indicator can be displayed in the virtual environment picture more completely, thereby avoiding a case that because the directional skill indicator is too long to display completely, a target is hard to be accurately aimed at. In this way, the complete directional skill indicator can help accurately aim at the target, thereby reducing the operation time required, reducing a client's calculations load resulted from invalid operations, improving the running efficiency of the client, and improving the man-machine interaction efficiency of the directional skill indicator in a case of aiming at the target.

BRIEF DESCRIPTION OF THE DRAWINGS

FIG. 2 is a flowchart of a method for displaying a virtual environment picture according to an exemplary embodiment of this application.

FIG. 3 is a schematic diagram of a virtual environment picture according to an exemplary embodiment of this application.

FIG. 10 is a schematic diagram of a virtual environment picture according to another exemplary embodiment of this application.

FIG. 11 is a flowchart of a method for displaying a virtual environment picture according to another exemplary embodiment of this application.

FIG. 14 is a schematic diagram of a virtual environment picture according to another exemplary embodiment of this application.

FIG. 15 is a flowchart of a method for displaying a virtual environment picture according to another exemplary embodiment of this application.

DESCRIPTION OF EMBODIMENTS

Figure 1:
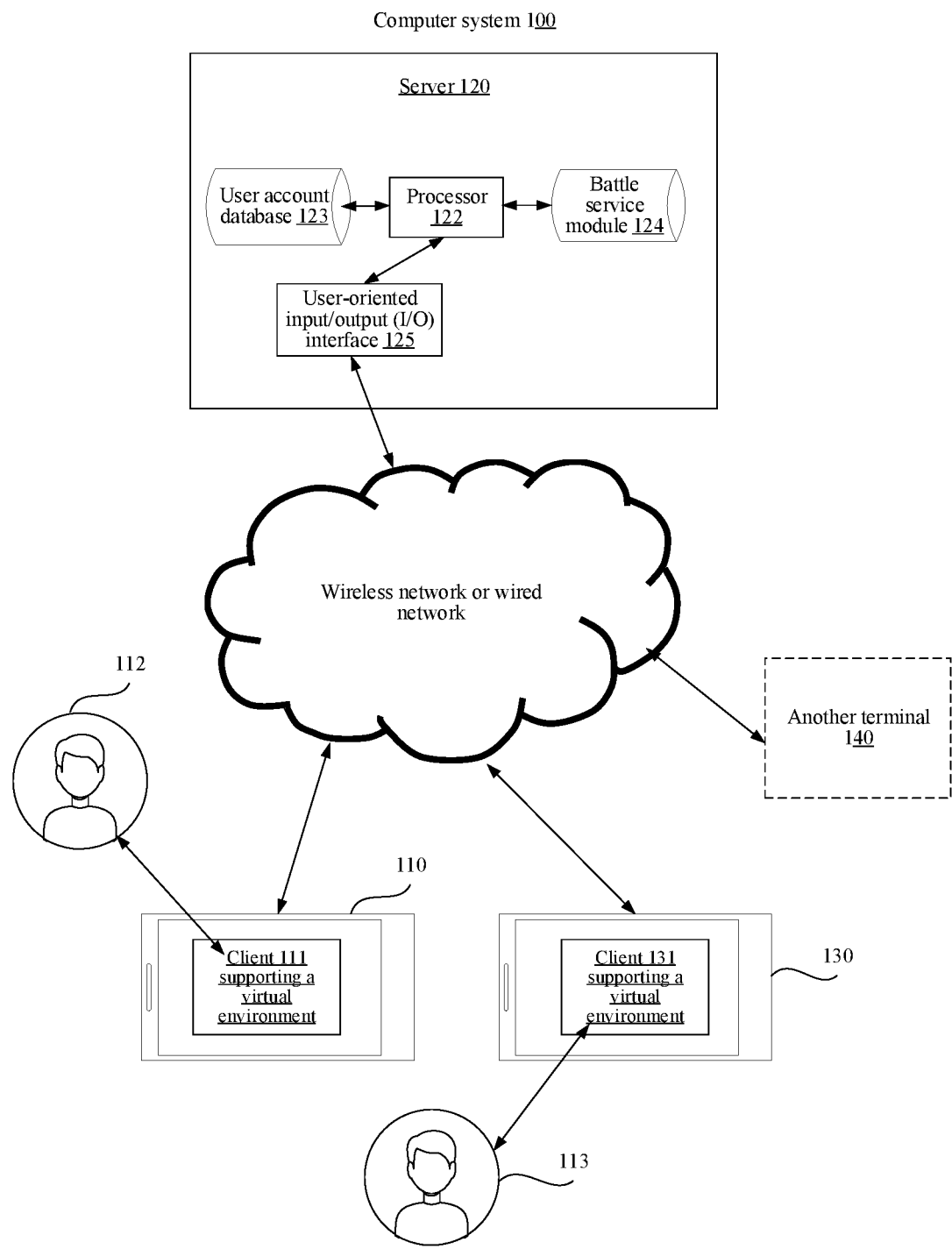
FIG. 1 is a structural block diagram of a computer system according to an exemplary embodiment of this application.

First, terms involved in the embodiments of this application are briefly introduced.

A virtual environment is a virtual environment displayed (or provided) by an application when run on a terminal. The virtual environment may be a simulation of a real world, or may be a semi-simulated semi-fictional three-dimensional world, or may be an entirely fictional three-dimensional world. The virtual environment may be any one of a two-dimensional virtual environment, a 2.5-dimensional virtual environment, and a three-dimensional virtual environment. In some embodiments, the virtual environment is further used for a virtual environment battle between at least two virtual characters, and there are virtual resources available to the at least two virtual characters in the virtual environment. In some other embodiments, the virtual environment includes a lower left corner region and an upper right corner region that are symmetrical. Virtual characters on two opposing sides occupy the regions respectively, and the objective of each side is to destroy a target building, a fort, a base, or a crystal deep in the opponent's region to win.

A virtual character is a movable object in a virtual environment. The movable object may be at least one of a virtual person, a virtual animal, and a cartoon person. In some embodiments, when the virtual environment is a three-dimensional virtual environment, virtual characters may be three-dimensional models. Each virtual character has a shape and a volume in the three-dimensional virtual environment, and occupies some space in the three-dimensional virtual environment. In some other embodiments, the virtual character is a three-dimensional character constructed based on a three-dimensional human skeleton technology. The virtual character may wear different skins to implement different appearances. In some implementations, the virtual character may be alternatively implemented by using a 2.5-dimensional model or a two-dimensional model. This is not limited in the embodiments of this application.

A MOBA is an arena in which different virtual teams on at least two opposing camps occupy respective map regions in a virtual environment, and compete against each other using a specific victory condition as a goal. The victory condition may include, but is not limited to at least one of occupying a fort or destroying a fort of the opposing camp, killing virtual characters in the opposing camp, ensuring own survival in a specified scene and time, seizing a specific resource, or outscoring the opponent within a specified time. The battle arena game may take place in rounds. The same map or different maps may be used in different rounds of the battle arena game. Each virtual team may include one or more virtual characters, for example, 1 virtual character, 2 virtual characters, 3 virtual characters, or 5 virtual characters.

A MOBA game is a game in which several forts are provided in a virtual environment, and users on different camps control virtual characters to battle in the virtual environment to occupy forts or destroy forts of the opposing camp. For example, in the MOBA game, the users may be divided into two opposing camps. The virtual characters controlled by the users are scattered in the virtual environment to compete against each other, and the victory condition is to destroy or occupy all opponent forts. The MOBA game takes place in rounds. A duration of one round of the MOBA game is from a moment at which the game starts to a movement at which the victory condition is met.

A user interface (UI) control is any visual control or element that can be seen in a UI of an application, for example, a control such as a picture, an input box, a text box, a button, or a label. Some UI controls respond to an operation of a user, for example, a skill control, which controls a master virtual character to cast a skill. The user triggers the skill control to control the master virtual character to cast the skill. UI controls involved in the embodiments of this application include, but are not limited to: skill controls and movement controls.

FIG. 1 is a structural block diagram of a computer system according to an exemplary embodiment of this application. The computer system 100 includes a first terminal 110, a server 120, and a second terminal 130.

A client 111 supporting a virtual environment is installed and run on the first terminal 110, and the client 111 may be a multiplayer online battle program. When the first terminal runs the client 111, a UI of the client 111 is displayed on a screen of the first terminal 110. The client may be any one of a military simulation program, an escape shooting game, a virtual reality (VR) application, an augmented reality (AR) program, a three-dimensional map program, a VR game, an AR game, a first-person shooting (FPS) game, a third-person shooting (TPS) game, a MOBA game, and a simulation game (SLG). In this embodiment, an example in which the client is a MOBA game is used for description. The first terminal 110 is a terminal used by a first user 112. The first user 112 uses the first terminal 110 to control a first virtual character located in the virtual environment to perform activities, and the first virtual character may be referred to as a master virtual character of the first user 112. The activities of the first virtual character include, but are not limited to: at least one of adjusting body postures, crawling, walking, running, riding, jumping, driving, picking, shooting, attacking, and throwing. For example, the first virtual character is a first virtual person, for example, a simulated person character or a cartoon person character.

A client 131 supporting a virtual environment is installed and run on the second terminal 130, and the client 131 may be a multiplayer online battle program. When the second terminal 130 runs the client 131, a UI of the client 131 is displayed on a screen of the second terminal 130. The client may be any one of a military simulation program, an escape shooting game, a VR application, an AR program, a three-dimensional map program, a VR game, an AR game, an FPS game, a TPS game, a MOBA game, and an SLG. In this embodiment, an example in which the client is a MOBA game is used for description. The second terminal 130 is a terminal used by a second user 113. The second user 113 uses the second terminal 130 to control a second virtual character located in the virtual environment to perform activities, and the second virtual character may be referred to as a master virtual character of the second user 113. Schematically, the second virtual character is a second virtual person, for example, a simulated person character or a cartoon person character.

In some embodiments, the first virtual character and the second virtual character are located in the same virtual environment. In some other embodiments, the first virtual character and the second virtual character belong to the same camp, the same team, or the same organization, have a friend relationship, or have a temporary communication permission. In some other embodiments, the first virtual character and the second virtual character belong to different camps, different teams, or different organizations, or have a hostile relationship with each other.

In some embodiments, the client installed on the first terminal 110 is the same as the client installed on the second terminal 130, or the clients installed on the two terminals are the same type of clients of different operating system platforms (Android system or iOS system). The first terminal 110 may generally refer to one of a plurality of terminals, and the second terminal 130 may generally refer to another one of a plurality of terminals. In this embodiment, only the first terminal 110 and the second terminal 130 are used as an example for description. The first terminal 110 and the second terminal 130 are of the same or different device types. The device type includes at least one of a smartphone, a tablet computer, an e-book reader, an MP3 player, an MP4 player, a laptop, and a desktop computer.

FIG. 1 shows only two terminals. However, a plurality of other terminals 140 may access the server 120 in different embodiments. Optionally, one or more terminals 140 are terminals corresponding to a developer. A developing and editing platform for the client supporting a virtual environment is installed on the terminal 140. The developer may edit and update the client on the terminal 140 and transmit an updated client installation package to the server 120 by using a wired or wireless network. The first terminal 110 and the second terminal 130 may download the client installation package from the server 120 to update the client.

The first terminal 110, the second terminal 130, and the other terminal 140 are connected to the server 120 through a wireless network or a wired network.

The server 120 includes at least one of one server, a plurality of servers, a cloud computing platform, and a virtualization center. The server 120 is configured to provide a background service for a client supporting a virtual environment. In some embodiments, the server 120 is responsible for primary computing work, and the terminals are responsible for secondary computing work. Alternatively, the server 120 is responsible for secondary computing work, and the terminals are responsible for primary computing work. Alternatively, collaborative computing is performed by using a distributed computing architecture between the server 120 and the terminals.

In a schematic example, the server 120 includes a processor 122, a user account database 123, a battle service module 124, and a user-oriented input/output (I/O) interface 125. The processor 122 is configured to load instructions stored in the server 121, and process data in the user account database 123 and the battle service module 124. The user account database 123 is used for storing data of user accounts used by the first terminal 110, the second terminal 140, and/or the other terminal 140, for example, profile pictures of the user accounts, nicknames of the user accounts, combat power indices of the user accounts, and service regions in which the user accounts are located. The battle service module 124 is configured to provide a plurality of battle rooms to users for a battle, for example, a 1V1 battle, a 3V3 battle, or a 5V5 battle. The user-oriented I/O interface 125 is configured to establish communication with the first terminal 110 and/or the second terminal 130 by using a wireless network or wired network to exchange data.

Exemplarily, an example in which the method for displaying a virtual environment picture provided in this application is applied to a MOBA game is used.

In the MOBA game, a user may control, by controlling a skill control, a master virtual character to cast a skill. There is a skill cast manner as follows: the user presses the skill control to call out a wheel virtual joystick of the skill control, slides the wheel virtual joystick to aim at a skill cast direction (aiming direction), and releases the wheel virtual joystick to control the master virtual character to cast the skill in the skill cast direction. When the user calls out the wheel virtual joystick of the skill control, a directional skill indicator is displayed in a virtual environment picture. The directional skill indicator is an arrow control points to the aiming direction by using a position of the master virtual character as a starting point. The length of an arrow is determined according to a distance that the skill can be cast. The directional skill indicator is configured to show an action range after the skill is cast.

Exemplarily, if the distance that the skill can be cast is too long, the directional skill indicator cannot be completely displayed in the virtual environment picture obtained by using the position of the master virtual character as an observation center of a camera model, and the user cannot learn the action range of the skill by observing the directional skill indicator.

Therefore, this application provides a method for displaying a virtual environment picture. When the directional skill indicator is at least partially outside the virtual environment picture, the camera model is controlled to offset toward the aiming direction, so that the directional skill indicator is completely displayed in the virtual environment picture. Exemplarily, this application provides two camera model offset methods: frame-against offset and direct offset.

The frame-against offset is to define a visual field determining box in a virtual environment. The shape of the visual field determining box is determined according to the shape of a display screen of a terminal (and another factor). The center of the visual field determining box is a position at which a camera model is aimed in the virtual environment. In an example in which the screen of the terminal is a rectangle, the position at which the camera model is aimed in the virtual environment is used as the center of the visual field determining box, and the length and width of the visual field determining box are determined according to the length and width of the screen. The size of the visual field determining box is slightly smaller than that of the screen. A long side of the visual field determining box is perpendicular to an observing direction of the camera model, and a short side is parallel to the observing direction of the camera model; or the short side of the visual field determining box is perpendicular to the observing direction of the camera model, and the long side is parallel to the observing direction of the camera model. Exemplarily, the visual field determining box moves with the movement of the camera model in the virtual environment. Exemplarily, when the camera model is not offset, the center of the visual field determining box is located at the position of the master virtual character.

When the user controls the skill control, and an end of the directional skill indicator is at least partially outside the visual field determining box, a client controls the camera model to move in the aiming direction of the directional skill indicator until edges of the directional skill indicator are included in the visual field determining box. Exemplarily, the client determines any point (usually the end) on the directional skill indicator as an offset calculation point. When the offset calculation point is outside the visual field determining box, the client calculates a vertical offset distance from the offset calculation point to an upper or lower frame or a left or right frame of the visual field determining box, determines an offset of the camera model according to vertical offset distances of the offset calculation point in at least one direction and at most two directions, and controls, according to the offset, the camera model to offset, so that the end of the directional skill indicator is included in the visual field determining box.

When the camera model is offset, the end of the directional skill indicator is against a frame of the visual field determining box (that is, there is an intersection between the end of the directional skill indicator and the frame of the visual field determining box). In this case, if the user controls the directional skill indicator to move in another direction, and the end of the directional skill indicator is in the visual field determining box and is no longer against the frame of the visual field determining box, the client controls the camera model to move to a default position (a position with the master virtual character as an observation center), so that the end of the indicator is against the frame of the visual field determining box again, until the camera model returns to the default position.

Exemplarily, if the camera model is controlled in the frame-against manner to offset, the camera model has a maximum offset distance. That is, if the vertical offset distance calculated according to the offset calculation point and the visual field determining box exceeds the maximum offset distance, the offset of the camera model is not determined according to the vertical offset distance but the maximum offset distance, so as to prevent an excessive offset from causing dizziness to the user.

The direct offset is to determine the offset of the camera model according to an angle α formed between the directional skill indicator and a horizontal direction. Exemplarily, a developer sets an upper offset distance, a lower offset distance, a left offset distance, and a right offset distance for each skill that is offset in the direct offset manner. The upper offset distance, the lower offset distance, the left offset distance, and the right offset distance are given default values. When the user controls the directional skill indicator to aim at a direction, the client obtains the angle α between the directional skill indicator and the horizontal direction, and determines the direction at which the directional skill indicator is aimed. If the directional skill indicator is aimed at the upper right, an offset of the camera model to the right is equal to cos α*right offset distance, and an upward offset of the camera model is equal to sin α*upper offset distance, and the camera model is then controlled to offset according to the offsets of the camera model.

Exemplarily, the client may control, in any one of the above two manners, the camera model to offset, so that the directional skill indicator can be better displayed in the virtual environment picture.

Exemplarily, a movement manner in which the client controls the camera model to offset may be arbitrary. For example, the client may control the camera model to move to an offset end point at a uniform speed, or control the camera model to perform a differential motion or a smooth damped motion to the offset end. Exemplarily, a manner in which the camera model returns from an offset position to the default position may alternatively be any one of a uniform motion, a differential motion, and a smooth damped motion.

Exemplarily, different camera model offset manners and movement manners may further be used for different skills of the same master virtual character.

FIG. 2 is a flowchart of a method for displaying a virtual environment picture according to an exemplary embodiment of this application. The method may be performed by a client running on any terminal in FIG. 1. The client is a client supporting a virtual environment. The method includes:

Step 201: Display a first virtual environment picture, the first virtual environment picture being a picture obtained by observing a virtual environment by using a first observation position as an observation center, the first virtual environment picture displaying a master virtual character located in the virtual environment.

Exemplarily, the virtual environment picture is a two-dimensional picture that is obtained by performing picture capture on a three-dimensional virtual environment and that is displayed on the client. Exemplarily, the shape of the virtual environment picture is determined according to the shape of a display screen of a terminal, or according to the shape of a user interface (UI) of the client. In an example in which the display screen of the terminal is rectangular, the virtual environment picture is also displayed as a rectangular picture.

The first virtual environment picture is a virtual environment picture obtained by using the first observation position in the virtual environment as an observation center. The observation center is the center of the virtual environment picture. The observation center corresponds to an observation position in the virtual environment. In an example in which the virtual environment picture is a rectangular picture, an intersection of rectangular diagonals of the virtual environment picture is the observation center. Assuming that the master virtual character in the virtual environment picture is located in the observation center, a position of the master virtual character in the virtual environment is the observation position. The observation position is a coordinate position in the virtual environment. When the virtual environment is a three-dimensional virtual environment, the observation position is a coordinate position represented by three-dimensional coordinates. Exemplarily, if the ground in the virtual environment is a horizontal plane, a height coordinate of the observation position is 0, and the observation position may be approximated as two-dimensional coordinates on the horizontal plane.

Different virtual environment pictures may be obtained from the virtual environment by using different observation positions as an observation center. The first virtual environment picture is a virtual environment picture obtained by using the first observation position as an observation center. The second virtual environment picture is a virtual environment picture obtained by using a second observation position as an observation center.

The master virtual character is a virtual character controlled by the client. The client controls activities of the master virtual character in the virtual environment according to received user operations. Exemplarily, the activities of the master virtual character in the virtual environment include: walking, running, jumping, climbing, getting down, attacking, casting a skill, picking up a prop, and transmitting a message.

A skill is an ability that is used or cast by a virtual character to attack another virtual character (including the other virtual character and the virtual character itself) and generate a debuff or a buff. Skills include active skills and passive skills. The active skill is a skill that is actively used or cast by a virtual character. The passive skill is a skill that is automatically triggered when a passive condition is met. Exemplarily, the skill mentioned in this embodiment is an active skill that is actively used and cast by the master virtual character controlled by the user.

Exemplarily, the position of the master virtual character in the virtual environment may be the first observation position or another position in the virtual environment. Exemplarily, in the method for displaying a virtual environment picture provided in this embodiment, the virtual environment picture is set to keep the master virtual character as the observation center in a default case. The default case refers to a display status of the virtual environment picture when a perspective is not moved or switched. For example, the movement or switch of the perspective includes at least one of dragging a map to view a surrounding terrain, pressing and holding a minimap to view a terrain at a specified location, observing the virtual environment by using another virtual character as an observation center after the master virtual character died, and the user controlling the master virtual character to cast a skill toward a region outside a current line of sight. Exemplarily, if the first virtual environment picture is a virtual environment picture obtained in a default case, the master virtual character is at the first observation position. If a perspective of the first virtual environment picture has been moved, the master virtual character may not be at the first observation position, or may be even not in the first virtual environment picture.

Exemplarily, FIG. 3 shows a first UI displayed on the client. The first UI includes a first virtual environment picture 301, and a master virtual character 302 is displayed in the first virtual environment picture 301. The first virtual environment picture 301 is rectangular, and there is an observation center 303 at an intersection of rectangle diagonals. The observation center 303 corresponds to the first observation position in the virtual environment, and the master virtual character 302 is at the first observation position. Exemplarily, a UI control, for example, a movement control 304, a skill control 305, or an attack control 306, may further be displayed on the first virtual environment picture. The movement control 304 is configured to control the master virtual character to move. The skill control 305 is configured to control the master virtual character to cast a skill. The attack control 306 is configured to control the master virtual character to launch an attack. Exemplarily, the UI control occludes a part of the first virtual environment picture 301.

Step 202: Display, in response to receiving a first directional instruction generated by a first directional operation, a directional skill indicator pointing to a first direction, the directional skill indicator being a directional identifier that uses a position of the master virtual character as a starting point and that points to the first direction.

The first directional operation is a user operation received by the client. The client generates the first directional instruction according to the received user operation, and displays the directional skill indicator according to the first directional instruction. Exemplarily, the user operation includes at least one operation of an operation on the UI control, a voice operation, an action operation, a text operation, a mouse operation, a keyboard operation, and a game joystick operation. For example, the client generates the first directional instruction by recognizing a voice instruction of the user, generating the first directional instruction by recognizing an action of the user, generating the first directional instruction by recognizing texts inputted by the user, and so on. Exemplarily, the first directional operation is an operation performed by the user on the skill control.

Figure 4:
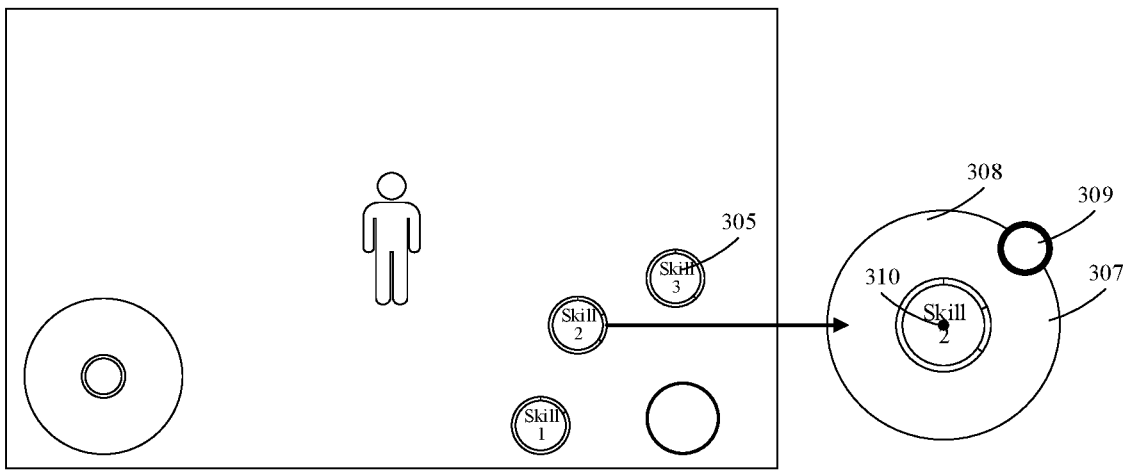
FIG. 4 is a schematic diagram of a method for using a skill control according to an exemplary embodiment of this application.

For example, the skill control is a wheel virtual joystick control. As shown in FIG. 4, a round skill control 305 is displayed on a first UI. A user may call out a wheel virtual joystick 307 of the skill control by pressing and holding the skill control 305. The wheel virtual joystick includes a big circle 308 (a wheel part) and a small circle 309 (a remote sensing part). The big circle 308 is an operable range of the wheel virtual joystick, and the small circle 309 is a position currently pressed by a finger of the user. The user may slide the small circle 309 within a range of the big circle 308 arbitrarily. Exemplarily, the wheel virtual joystick is a directional joystick. The wheel virtual joystick determines a direction of a user operation according to a direction in which the small circle 309 is offset from a center point 310, and controls, according to the direction of the user operation, the master virtual character to cast a skill toward the same direction in the virtual environment. Exemplarily, the operation of the user casting the skill by operating the skill control is to: press and hold the skill control to call out the wheel virtual joystick, slide the wheel virtual joystick to a target direction, and release the wheel virtual joystick to cast the skill.

The first directional instruction includes a first direction. Exemplarily, the user controls the directional skill indicator to point to the first direction by moving the skill control to the first direction.

The directional skill indicator is a skill indicator corresponding to a directional skill. A directional skill is a skill cast according to an aiming direction of the user. The directional skill indicator is a directional auxiliary identifier displayed in the virtual environment. The directional skill indicator is configured to show the user a skill cast direction corresponding to a current user operation in the virtual environment, which helps the user aim. Exemplarily, the directional skill indicator is a directional identifier that uses the master virtual character as a starting point and that is displayed on the ground of the virtual environment. A direction pointed by the directional skill indicator is the same as a direction pointed by the skill control operated by the user. That is, the direction pointed by the directional skill indicator in the virtual environment is consistent with a direction pointed by the wheel virtual joystick controlled by the user. Exemplarily, because the virtual environment picture is a projection picture of the virtual environment, the direction pointed by the directional skill indicator displayed in the virtual environment picture may be the same as or slightly different from the direction pointed by the wheel virtual joystick.

Exemplarily, the directional skill indicator is not only configured to indicate a direction, but can also indicate an action range after the skill is cast. For example, the width and length of the directional skill indicator are determined according to the width and the longest distance of casting a skill.

Figure 5:
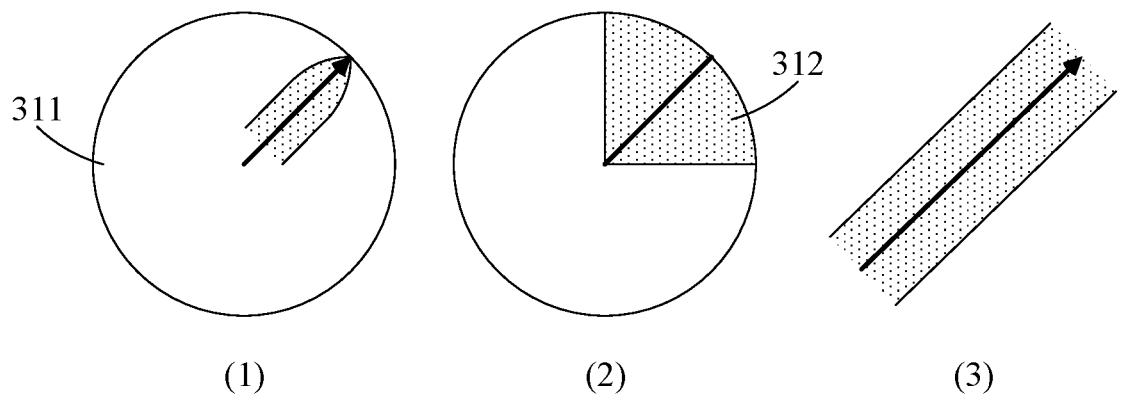
FIG. 5 is a schematic diagram of a directional skill indicator according to an exemplary embodiment of this application.
Figure 6:
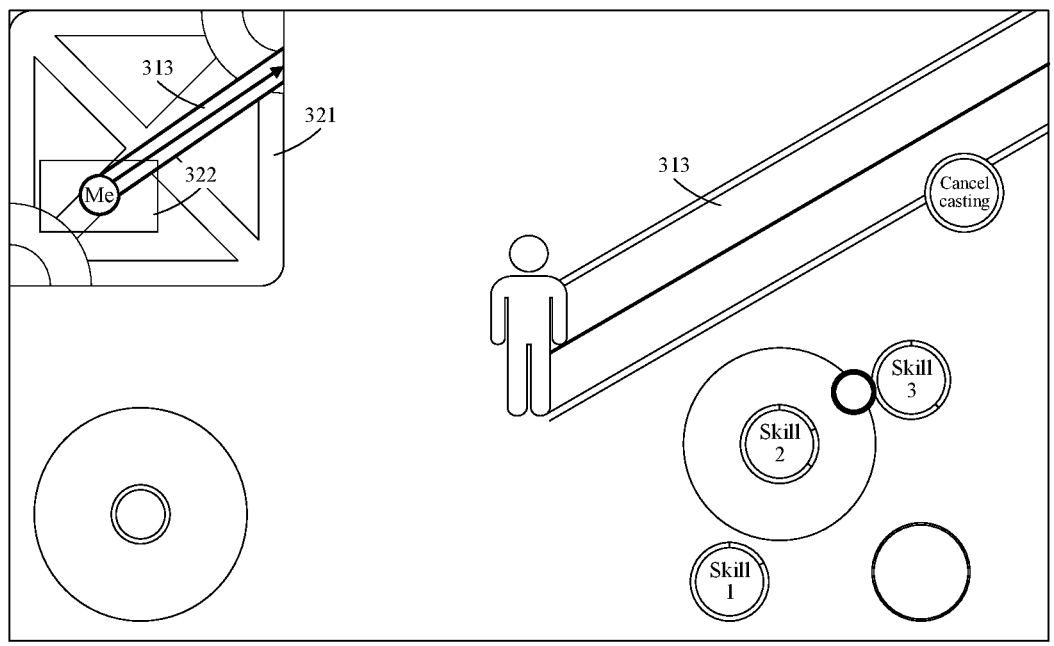
FIG. 6 is a schematic diagram of a virtual environment picture according to another exemplary embodiment of this application.

Exemplarily, according to different directional skills, styles of the directional skill indicator are also different. FIG. 5 shows three directional skill indicators corresponding to three different directional skills. Directions of the three directional skill indicators are all diagonally upwards of 45°. A skill corresponding to (1) of FIG. 5 is skill 1, and the skill 1 is a skill that has the longest action distance and is cast in a direction in which a user is aiming. The longest action distance of the skill 1 is the radius of a circle 311. The center of the circle 311 is a position of the master virtual character. A directional skill indicator points from the center of the circle 311 to any point on a side line of the circle 311. When the user controls the master virtual character to cast the skill, the client controls the master virtual character to cast a skill according to a direction in which the user is currently aiming. Reference may be made to the width of the directional skill indicator for the width of the skill. If an action target is within a cast range of the skill 1, the action target is affected by the skill 1. A skill corresponding to (2) of FIG. 5 is skill 2, and the skill 2 is a skill that has the longest action distance and automatically locks an action target based on an aiming direction of the user. For example, as shown in (2) of FIG. 5, a current aiming direction of a user is diagonally upwards of 45°. A fan-shaped range 312 of a directional skill indicator with the direction as a centerline is displayed. If the user casts a skill in the current aiming direction, the client automatically locks the action target within the fan-shaped range 312, and uses the skill 2 on the action target. Exemplarily, the skill 2 may have the longest action distance as the skill 1, or may have an infinite action distance as a skill 3. A skill corresponding to (3) of FIG. 5 is skill 3, and the skill 3 is a skill that has an infinite action distance and is cast in a direction in which a user is aiming. That is, the skill 3 is a skill that can be cast on an entire map. After the master virtual character casts a skill, the skill is shot from a position of the master virtual character in an aiming direction until the skill flies out of the virtual environment. Exemplarily, as shown in FIG. 6, it can be seen from a minimap 321 in the upper left corner that a range of a virtual environment currently displayed in the virtual environment picture is a range marked by a rectangular frame 322 in the minimap. The virtual environment picture displays a part of a directional skill indicator 313 corresponding to the skill 3. The directional skill indicator 313 may be seen completely in the minimap. The directional skill indicator 313 points from a position of the master virtual character to an edge of the minimap.

Exemplarily, an action target of a skill includes any three-dimensional model in the virtual environment, for example, a virtual character controlled by another client (a teammate or an opponent), a virtual character controlled by the client or a server (a monster, an animal, a plant, or the like), a building (a defensive tower, a base, a crystal, or the like), or a virtual vehicle (a car, an airplane, a motorcycle, or the like). Exemplarily, an effect of casting a skill by the master virtual character may alternatively be placing a virtual prop, for example, throwing a trap, a mine, a visual field detector, or the like.

Figure 7:
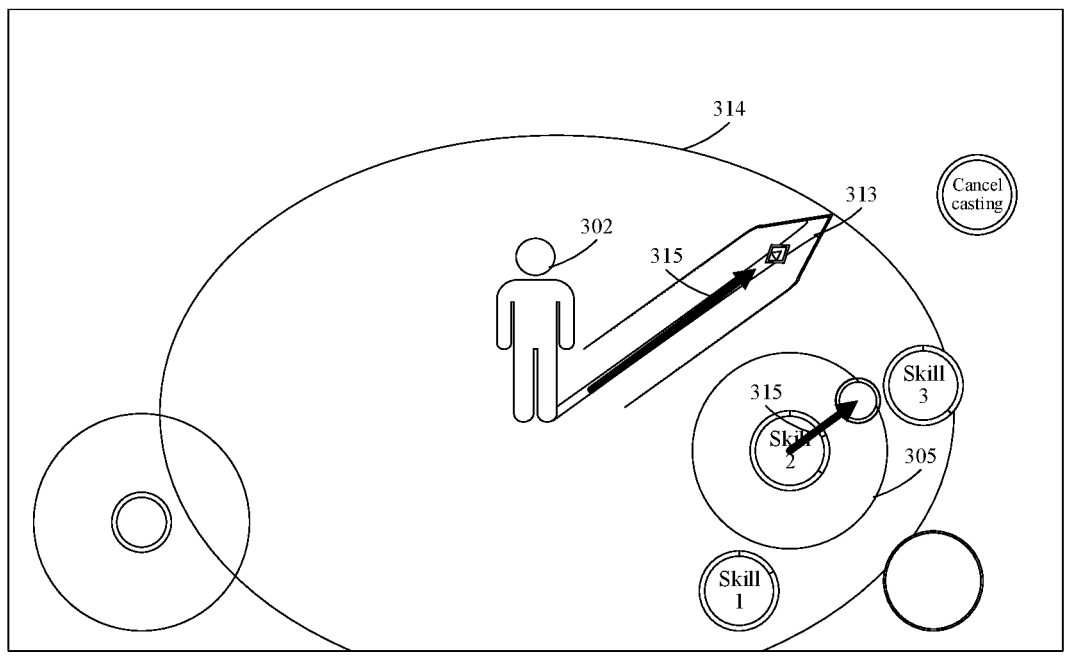
FIG. 7 is a schematic diagram of a virtual environment picture according to another exemplary embodiment of this application.

Exemplarily, FIG. 7 shows a directional skill indicator displayed in a UI. A directional skill indicator 313 is displayed in a virtual environment picture on the UI. The directional skill indicator 313 is a directional arrow that uses a position of a master virtual character 302 as a starting point and points to a first direction 315 in which a skill control 305 is currently aimed. Exemplarily, a direction pointed by the directional skill indicator 313 is the same as a direction pointed by the skill control 305. Exemplarily, the end of the directional skill indicator 313 is located on a circle 314, and the radius of the circle 314 is the longest action distance of a skill.

Figure 8:
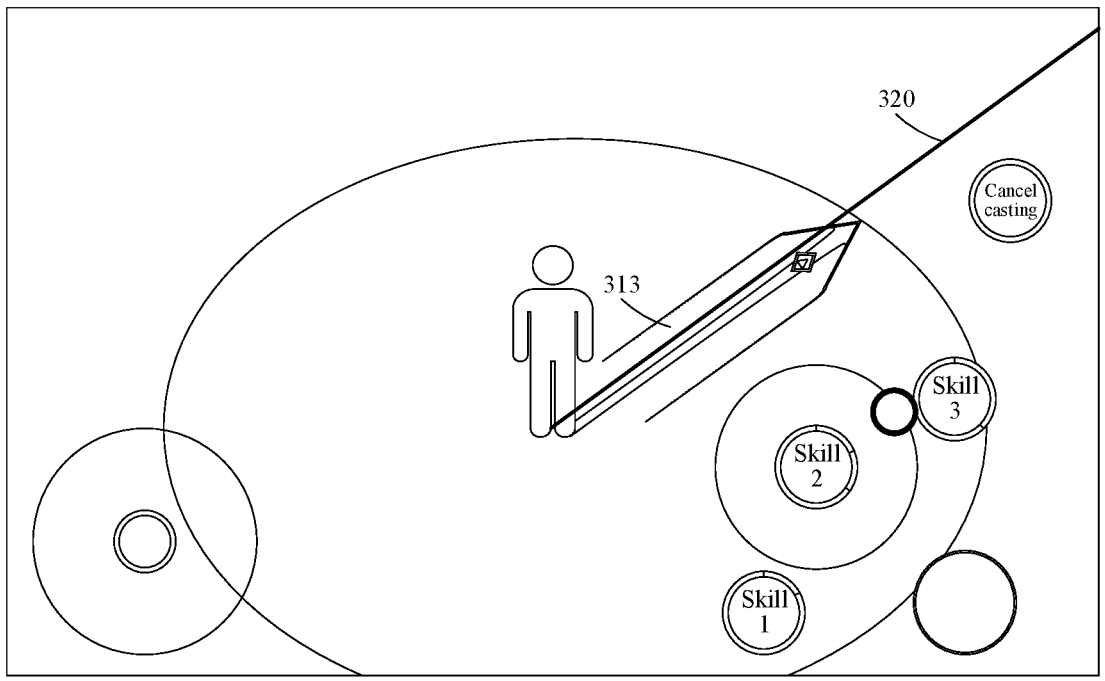
FIG. 8 is a schematic diagram of a virtual environment picture according to another exemplary embodiment of this application.
Figure 9:
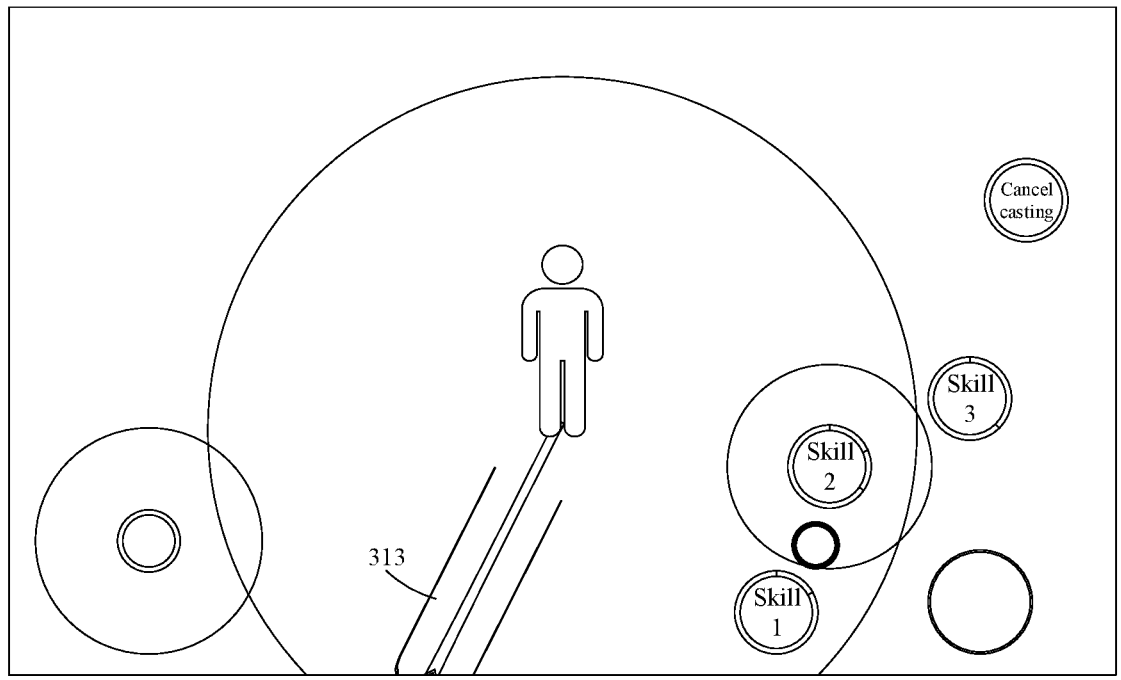
FIG. 9 is a schematic diagram of a virtual environment picture according to another exemplary embodiment of this application.

Exemplarily, if the first direction pointed by the directional skill indicator 313 is an oblique upward direction as shown in FIG. 8, then the directional skill indicator 313 can be seen completely in a virtual picture obtained by using the first position as an observation center. The user can determine, according to a range displayed by the directional skill indicator 313, an effect after the skill is cast. However, if the first direction pointed by the directional skill indicator is a diagonally downward direction as shown in FIG. 9, the directional skill indicator 313 cannot be completely seen in a virtual environment picture obtained by using a first position as an observation center. The user cannot determine, according to a range displayed by the directional skill indicator, an effect after the skill is cast. Assuming that there is an opponent virtual character at the end of the directional skill indicator 313, the user cannot see the opponent virtual character and cannot perform accurate aim and cast a skill, but can only cast the skill by feeling. Therefore, in step 203, the observation center of the virtual environment picture is moved by a specific distance along the first direction, so that the directional skill indicator can be displayed more completely in the virtual environment picture.

Step 203: When a length of the directional skill indicator is greater than a distance threshold in the first virtual environment picture, display a second virtual environment picture, the second virtual environment picture being a picture obtained by observing the virtual environment by using a second observation position as an observation center, the second virtual environment picture including the directional skill indicator, and the second observation position being in the first direction of the first observation position or in a surrounding region in the first direction.

The second observation position is a position corresponding to a center point (the observation center) of the second virtual environment picture in the virtual environment. Exemplarily, the second observation position is a position moved by a specific distance in the first direction from the first observation position. Exemplarily, the second observation position may alternatively be moved along a surrounding direction of the first direction. For example, the first direction is 45°, and the second observation position is moved in a 50° direction from the first observation position. That is, the second observation position is located in the first direction of the first observation position, or on a surrounding region of the first observation position in the first direction. Assuming that a ray pointing to the first direction with the first observation position as a starting point is a first ray, the second observation position is located on a second ray, or a distance from the second observation position to the first ray is less than a threshold. The surrounding region in the first direction is a set of points with a distance to the first ray less than the threshold.

Exemplarily, from the first virtual environment picture to the second virtual environment picture, the position of the master virtual character in the virtual environment does not change. If the master virtual character is at the first observation position in the first virtual environment picture, and the second virtual environment picture can display the master virtual character, the position of the master virtual character is still the first observation position.

Exemplarily, the second virtual environment picture displays a directional skill indicator completely (including an end of the directional skill indicator) or a relatively complete directional skill indicator (including most of the directional skill indicator, and excluding the end of the directional skill indicator). Exemplarily, a case that a relatively complete directional skill indicator is displayed is compared with a case that the observation center is not offset (the first observation position is still used as the observation center), and a more complete directional skill indicator is displayed in a virtual environment picture.

Exemplarily, as shown in FIG. 10, an observation center of a second virtual environment picture 317 is a second observation position 316. Assuming that the master virtual character is at a first observation position 318 in the first virtual environment picture, the second observation position 316 is located in a first direction of the first observation position 318, and a directional skill indicator 313 also points to the first direction. In this case, the directional skill indicator 313 can be completely displayed on the second virtual environment picture 317. Exemplarily, as shown in FIG. 9, in the virtual environment picture with the first observation position as an observation center, the user cannot see the end of the directional skill indicator 313. However, in the second virtual environment picture with the second observation position as an observation center in FIG. 10, the user can see the end of the directional skill indicator 313 and another virtual character 319 at the end. The user can more accurately control the directional skill indicator 313 to aim at the other virtual character 319, and further cast a skill to the other virtual character 319.

Based on the above, in the method provided in this embodiment, by controlling an observation center to move in a direction pointed by a directional skill indicator, a master virtual character is no longer used as an observation center of a virtual environment picture, so that the directional skill indicator can be displayed in the virtual environment picture more completely, thereby avoiding a case that because the directional skill indicator is too long to display completely, a target cannot be accurately aimed at. In this way, the directional skill indicator can accurately attack the target, thereby reducing the time to aim at the target, avoiding a client from performing more invalid calculations during an aiming process, improving the running efficiency of the client, and improving the man-machine interaction efficiency of the directional skill indicator in a case of aiming at the target.

Exemplarily, when the length of the directional skill indicator exceeds a current displayable range of the virtual environment picture, the observation center is controlled to offset to a second observation position, and a second virtual environment picture is further displayed. Exemplarily, the offset of the observation center is performed by controlling an offset of a camera model.

FIG. 11 is a flowchart of a method for displaying a virtual environment picture according to another exemplary embodiment of this application. The method may be performed by a client running on any terminal in FIG. 1. The client is a client supporting a virtual environment. Based on the exemplary embodiments shown in FIG. 2, step 203 includes step 2031.

Step 2031: When a length of the directional skill indicator is greater than a distance threshold in the first virtual environment picture, display the second virtual environment picture, the distance threshold being a visual field threshold that uses the position of the master virtual character as a starting point in the first virtual environment picture and that is in the first direction.

Exemplarily, the directional skill indicator has an end, and the length of the directional skill indicator is a distance from the starting point to the end, that is, a distance from the position of the master virtual character to the end, that is, the longest action distance of a skill. Exemplarily, when the skill is a skill cast on an entire map, the directional skill indicator does not have an end, the length of the directional skill indicator is infinite, and the length of the directional skill indicator is greater than the distance threshold. Exemplarily, when the skill is a skill cast on an entire map, an intersection of the directional skill indicator and an edge of the map may also be determined as the end of the directional skill indicator.

The distance threshold is determined according to a visual field range of a current virtual environment picture in the first direction, that is, determined according to a visual field range of the first virtual environment picture in the first direction. The distance threshold is used for determining whether the visual field range of the current virtual environment picture is sufficient to display the complete or relatively complete directional skill indicator. Exemplarily, the visual field range refers to a region range of a virtual environment displayed in the current virtual environment picture. Alternatively, the visual field range refers to a region range of a virtual environment that can be displayed in the current virtual environment picture. Exemplarily, because a UI control is superimposed and displayed on the virtual environment picture, the UI control also occludes the visual field range of the current virtual environment picture. Therefore, to determine the distance threshold, an occlusion of the UI control in the first direction may further be considered.

Exemplarily, the distance threshold is a distance starts from the position of the master virtual character to the farthest point as the end point that can be seen in the virtual environment picture in the first direction pointed by the directional skill indicator. As shown in FIG. 8, a length of a line segment 320 starts from a position of the master virtual character to an edge of the virtual environment picture along the first direction is the distance threshold. Exemplarily, as shown in FIG. 6, if there is a minimap 321 occluding in a direction in which the first direction is located, a visual field range of the user in the first direction becomes smaller, and the distance threshold is correspondingly reduced.

Figure 12:
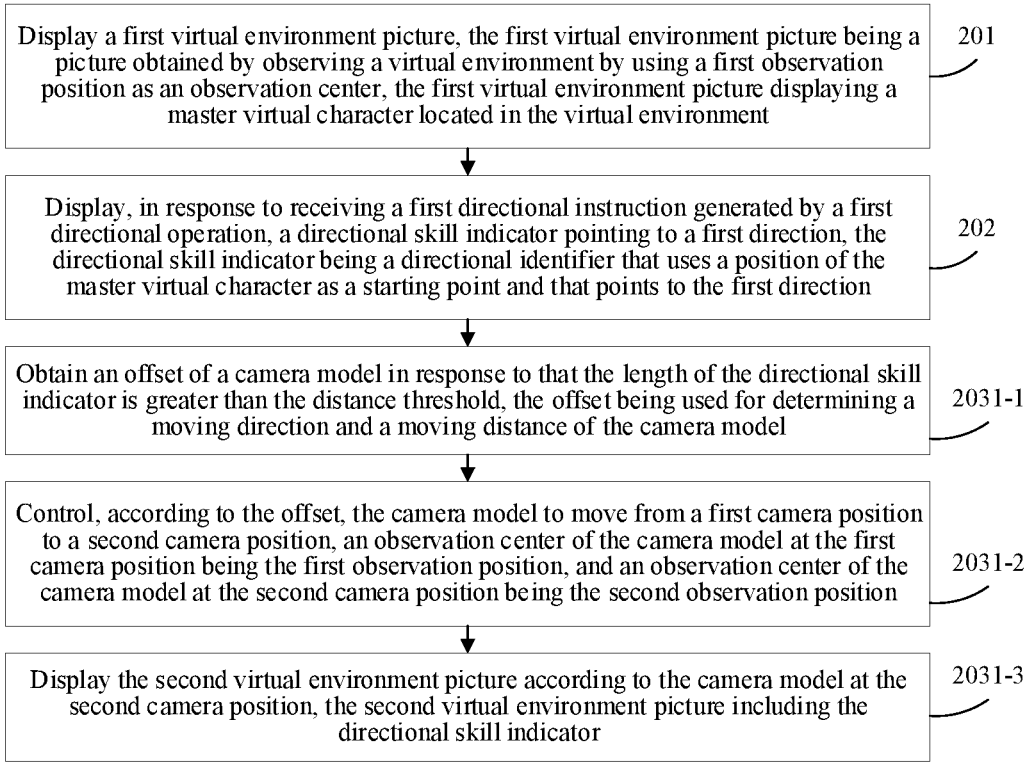
FIG. 12 is a flowchart of a method for displaying a virtual environment picture according to another exemplary embodiment of this application.

Exemplarily, the client obtains the virtual environment picture by capturing the virtual environment by using a camera model disposed in the virtual environment. As shown in FIG. 12, step 2031 further includes step 2031-1 to step 2031-3.

Step 2031-1: Obtain an offset of the camera model in response to that the length of the directional skill indicator is greater than the distance threshold, the offset being used for determining a moving direction and a moving distance of the camera model. In other words, the offset represents a shift of the cameral model in a two-dimensional direction.

The first virtual environment picture and the second virtual environment picture are pictures of the virtual environment that are captured by the camera model disposed in the virtual environment, and the observation center is an intersection of a ray emitted from a position of the camera model along an observing direction and the virtual environment.

Figure 13:
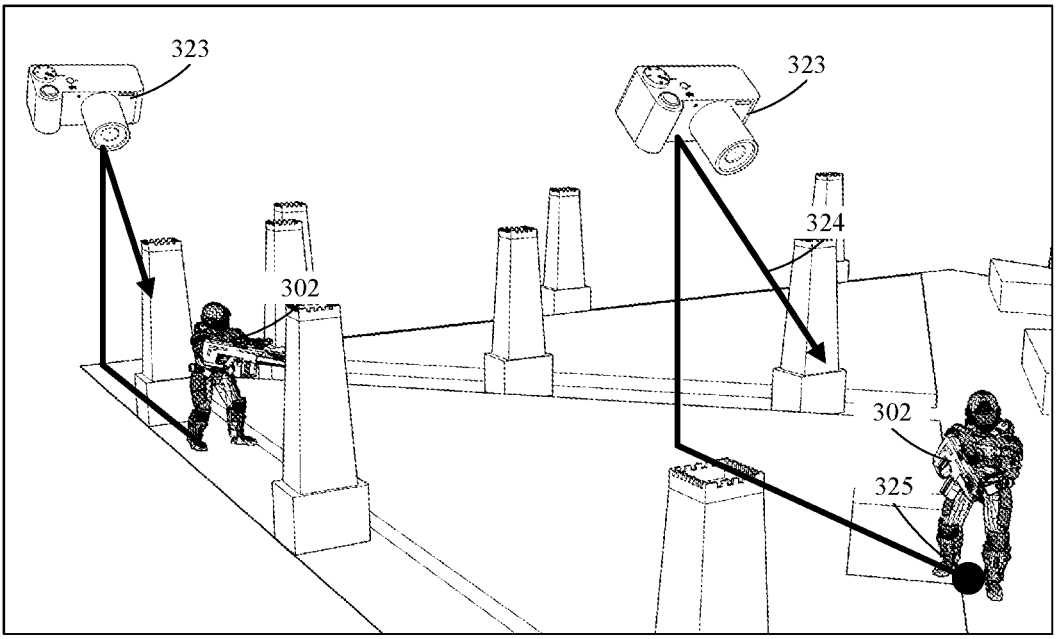
FIG. 13 is a schematic diagram of a virtual environment picture according to another exemplary embodiment of this application.

The camera model is a model that is disposed in the virtual environment to obtain a virtual environment picture. Exemplarily, the camera model is disposed in different manners by default. For example, a position of the camera model is bound to a three-dimensional model of the master virtual character (such as the head or an eye), a photographing direction (observing direction) of the camera model is rotated with a rotation of the head or the eye of the master virtual character, and the position of the camera model is moved with a movement of the position of the master virtual character, so that the virtual environment can be captured from a perspective of the master virtual character, and a virtual environment picture from a first-person perspective of the master virtual character is obtained. If the position of the camera model is bound to a position by a fixed distance and with a fixed height behind (at the back of) the master virtual character, the photographing direction (observing direction) of the camera model is rotated with a rotation of the body of the master virtual character, and the position of the camera model is moved with a movement of the position of the master virtual character, the virtual environment can be captured from an over-shoulder perspective of the master virtual character, and a virtual environment picture from the over-shoulder perspective of the master virtual character is obtained. If the position of the camera model and a relative position of the master virtual character are fixed, for example, the camera model is at a position 10 meters away and 10 meters high directly below (or in the south direction of) the master virtual character, the position of the camera model is moved with a movement of the position of the master virtual character, but the photographing direction is not changed with a rotation of the head or the body of the master virtual character, the virtual environment can be captured from a third-person perspective, and a virtual environment picture from the third-person perspective with the master virtual character as an observation object is obtained. Exemplarily, the camera model in this embodiment captures the virtual environment from a third-person perspective by using the master virtual character as an observation object in a default case. For example, the camera model is disposed to be 10 meters far south and 10 meters high from the position of the master virtual character to capture the master virtual character in an obliquely downward observing direction of 45°. If the position of the master virtual character is (0, 0, 0), the position of the camera model is (0, −10, 10). For example, as shown in FIG. 13, no matter where the master virtual character 302 moves in the virtual environment, a relative position of a camera model 323 and a master virtual character 302 is fixed, and a photographing direction of a camera model 323 does not change with a direction of the master virtual character 302. An observation center of the camera model 323 is an intersection 325 of a ray emitted from a position of the camera model along an observing direction 324 and the virtual environment, that is, a position of the master virtual character 302. Exemplarily, FIG. 13 is a picture captured from the virtual environment in a perspective manner. Because two camera models 323 are at different distances from a perspective point, there may be a slight difference in photographing directions (observing directions) of the camera models in the picture. However, in fact, the photographing directions (observing directions) of the camera model in the virtual environment are the same.

Exemplarily, in a default case, the camera model follows and photographs the master virtual character by using the master virtual character as an observation center. However, when the user moves or switches a perspective, the user can also manually change the position of the camera model in the virtual environment, or the client can automatically adjust the position of the camera model according to an operation of the user (for example, an operation of casting a skill), so that the client displays a virtual environment picture desired by the user. Exemplarily, a manner of changing the camera model to obtain different virtual environment pictures includes but is not limited to the following manners: changing a horizontal coordinate of the camera model, changing the height of the camera model, or changing an observing direction of the camera model. Changing the horizontal coordinate of the camera model can change an observation position of the camera model (the observation center in the virtual environment picture) to obtain another virtual environment picture. The change of the horizontal coordinate only changes the observation position and does not change the size of a visual field range in the virtual environment picture. Changing the height of the camera model does not change the observation position of the camera model (the observation center in the virtual environment picture), but changes the size of the visual field range. The higher the height of the camera model, the wider the visual field range, and a range of the virtual environment displayed by an obtained virtual environment picture is larger. Changing a pitch angle (angle in a vertical direction) of the camera model simultaneously changes the observation position and the size of the visual field range of the camera model. Changing a deflection angle (angle in a horizontal direction) of the camera model changes the observation position of the camera model without changing the size of the visual field range.

Exemplarily, in this embodiment, different virtual environment pictures are obtained by controlling the horizontal coordinate of the camera model in the virtual environment, so that a directional skill indicator is displayed more completely in the virtual environment picture.

Exemplarily, the height of the camera model may also be raised while changing the horizontal coordinate of the camera model, so that the visual field range of the virtual environment picture is further expanded.

Exemplarily, a directional skill indicator may be displayed more completely by changing at least one parameter of a focal length, a height, a deflection angle, and a pitch angle of the camera model. For example, the visual field range of the camera model is expanded by reducing the focal length of the camera model, or increasing the height of the camera model, or controlling the pitch angle and the deflection angle of the camera model to deflect in a direction pointed by the directional skill indicator. Exemplarily, the client may adopt any one or more of the foregoing manners of changing the camera model to display a directional skill indicator more completely in the virtual environment picture.

Offsets are a distance and direction by which the camera model moves. Offsets are the distance and direction by which the camera model is offset from a default position. The default position is a position of the camera model in a default case. Exemplarily, if the camera model is bound with the master virtual character as a photographed object (by using the position of the master virtual character as an observation center), the default position of the camera model is determined according to the position of the master virtual character. Exemplarily, if a rectangular coordinate system parallel to a horizontal plane is established, the offset is a direction vector pointing from the default position to a position after the offset. For example, if the camera model moves from a default position (0, 0) to a second camera position (1, 1), an offset is (1, 1).

Step 2031-2: Control, according to the offset, the camera model to move from a first camera position to a second camera position, an observation center of the camera model at the first camera position being the first observation position, and an observation center of the camera model at the second camera position being the second observation position.

Exemplarily, the client changes a horizontal coordinate position of the camera model in the virtual environment according to the offset, so that the camera model is moved from the first camera position to the second camera position. Exemplarily, the client determines an end point position of the current offset of the camera model according to the offset. Exemplarily, the first camera position may be the default position of the camera model, or may be a position to which the camera model has been offset once. If the first camera position is a position to which the camera model has been offset, a total offset of the camera model to the second camera position is equal to a sum of a first offset of the camera model that is offset from the default position to the first camera position and a second offset of the camera model that is offset from the first camera position to the second camera position.

For example, as shown in FIG. 14, a directional skill indicator 313 points to the left. When the directional skill indicator 313 cannot be completely displayed in a first visual field range 327 of a first virtual environment picture obtained by the camera model at a first camera position 326, the camera model is controlled to move to a second camera position 328, and the directional skill indicator 313 is completely displayed in a second visual field range 329 of a second virtual environment picture obtained at the second camera position 328.

The first virtual environment picture is obtained by the camera model at the first camera position, and an observation center of the camera model is the first observation position. The second virtual environment picture is obtained by the camera model at the second camera position, and an observation center of the camera model is the second observation position.

Exemplarily, an offset end point of the camera model can be determined according to the offset, and the camera model is then controlled to move slowly from an offset starting point to the offset end point according to a preset movement manner, so that a virtual environment picture displayed on the client is a continuously moving picture, not a picture that is jumped to instantly. As shown in FIG. 15, step 2031-2 further includes step 2031-21.

Step 2031-21: Control, according to the offset, the camera model to move from the first camera position to the second camera position in a specified movement manner, the specified movement manner including any one of a uniform motion, a differential motion, and a smooth damped motion.

Exemplarily, in order to make the display of the virtual environment picture on the client have continuity during the offset of the camera model, the camera model does not jump directly from the first camera position to the second camera position, and the camera model goes through many frames of pictures when moving from the first camera position to the second camera position. The client calculates, in different moving manners, a position to which the camera model needs to move in each frame of picture, so as to obtain the frame of picture by using the camera model at the position.

Exemplarily, the movement manner may be a uniform motion, which is to control the camera model to move to the second camera position at a constant speed. For example, if the offset of the camera model is 10 meters, and the client needs to control the camera model to move to a target position after 100 frames of pictures, the camera model needs to move 0.1 meters per frame of picture.

Exemplarily, the movement manner may alternatively be a differential motion. In the differential motion, a position of the camera model in each frame of picture is determined according to a current position of the camera model, a target position, and a moving ratio. For example, if the moving ratio is set to 0.1, the client calculates a difference between a position of the camera model in a previous frame of picture and the target position, and then controls the camera model to move to the target position by a distance of 0.1 times the difference. If the target position is 10 and the current position is 0, the camera model moves by a distance of 10*0.1=1 to a position of 1 in the next frame, then moves by a distance of (10-1)*0.1=0.9 to a position of 1.9 in the next frame, and then moves by a distance of (10-1.9)*0.1=0.81 to a position of 2.71 in the next frame. Moving in this way, the camera model never reaches the target position and only approaches the target position infinitely. Therefore, the moving ratio may be set to changing from 0 to 1. When a value of the moving ratio is 1, the camera model moves to the target position. The difference motion is a motion that determines a moving distance based on a distance difference and a moving ratio.

Exemplarily, the movement manner may alternatively be a smooth damped motion. The smooth damped motion is a motion that determines a moving distance based on a given moving time and a smooth function. The smooth function is a black box function. The smooth function is a function similar to a spring damper.

Exemplarily, the client may control, in different movement manners for different skills (the size of the directional skill indicator and an offset, and the like), the camera model to move, and may also control, according to a movement manner selected by a user, the camera model to move.

Step 2031-3: Display the second virtual environment picture according to the camera model at the second camera position, the second virtual environment picture including the directional skill indicator.

Exemplarily, after the camera model moves to the second camera position, the client determines a virtual environment picture obtained by the camera model as the second virtual environment picture.

Based on the above, in the method provided in this embodiment, when a directional skill indicator cannot be completely displayed in a virtual environment picture, the directional skill indicator can be more completely displayed by moving an observation center of the virtual environment picture, so that the directional skill indicator accurately attack a target, thereby reducing the time to aim at the target, avoiding a client from performing more invalid calculations during an aiming process, improving the running efficiency of the client, and improving the man-machine interaction efficiency of the directional skill indicator in a case of aiming at the target.

In the method provided in this embodiment, a movement of a camera model is further accurately controlled by calculating an offset of the camera model, so that the camera model can be accurately moved to a target camera position, the movement of the observation center of the virtual environment picture is controlled, and the directional skill indicator is completely displayed in the virtual environment picture, thereby improving the accuracy of casting a skill, reducing invalid operations of the client during an aiming process, and improving the man-machine interaction efficiency of skill aiming.

In the method provided in this embodiment, the camera model is further controlled in different movement manners to move from a first camera position to a second camera position, so that the virtual environment picture displayed on the client is a continuously moving picture, thereby avoiding a case that the virtual environment picture jumps too fast and causes dizziness to a user.

Exemplarily, this embodiment of this application includes two methods for calculating the offset. The first method is to calculate the offset of the camera model based on a visual field determining box.

Figure 16:
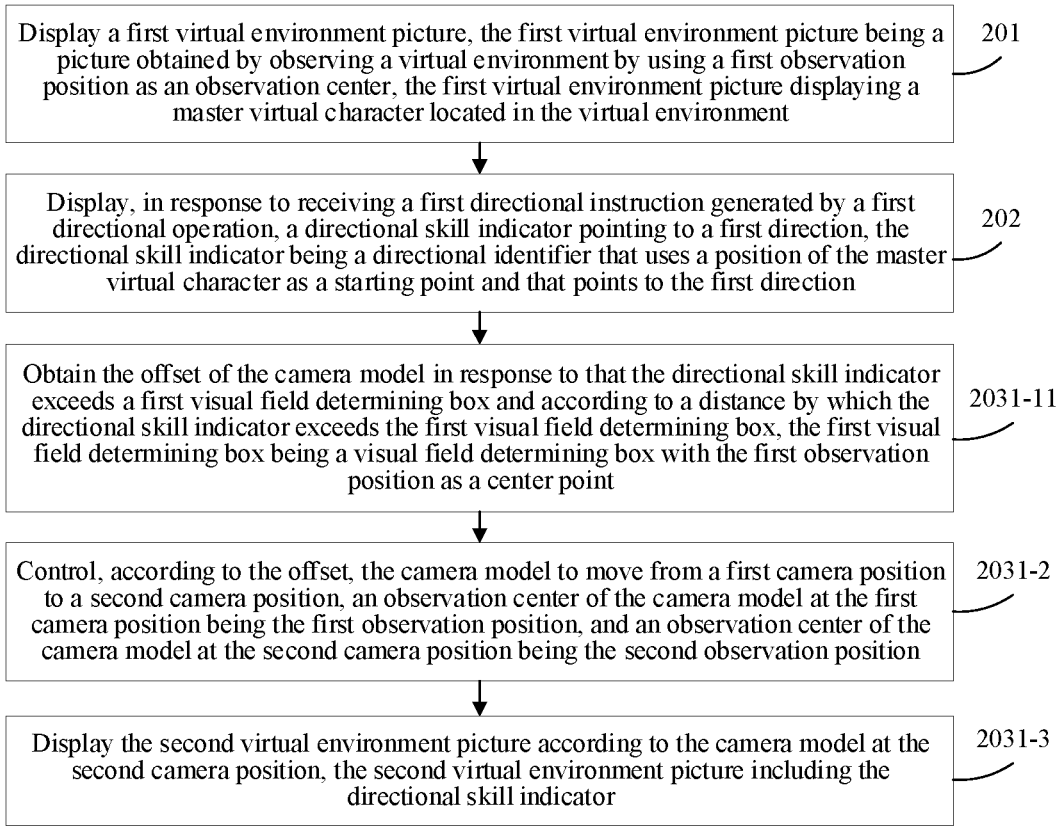
FIG. 16 is a flowchart of a method for displaying a virtual environment picture according to another exemplary embodiment of this application.

FIG. 16 is a flowchart of a method for displaying a virtual environment picture according to an exemplary embodiment of this application. The method may be performed by a client running on any terminal in FIG. 1. The client is a client supporting a virtual environment. Based on the exemplary embodiments shown in FIG. 12, step 2031-1 includes step 2031-11.

Step 2031-11: Obtain the offset of the camera model in response to that the directional skill indicator is at least partially outside a first visual field determining box and according to a distance by which the directional skill indicator is at least partially outside the first visual field determining box, the first visual field determining box being a visual field determining box with the first observation position as a center point.

The offset is calculated according to a visual field determining box, and the visual field determining box is configured to represent a visual field of the camera model.

Figure 17:
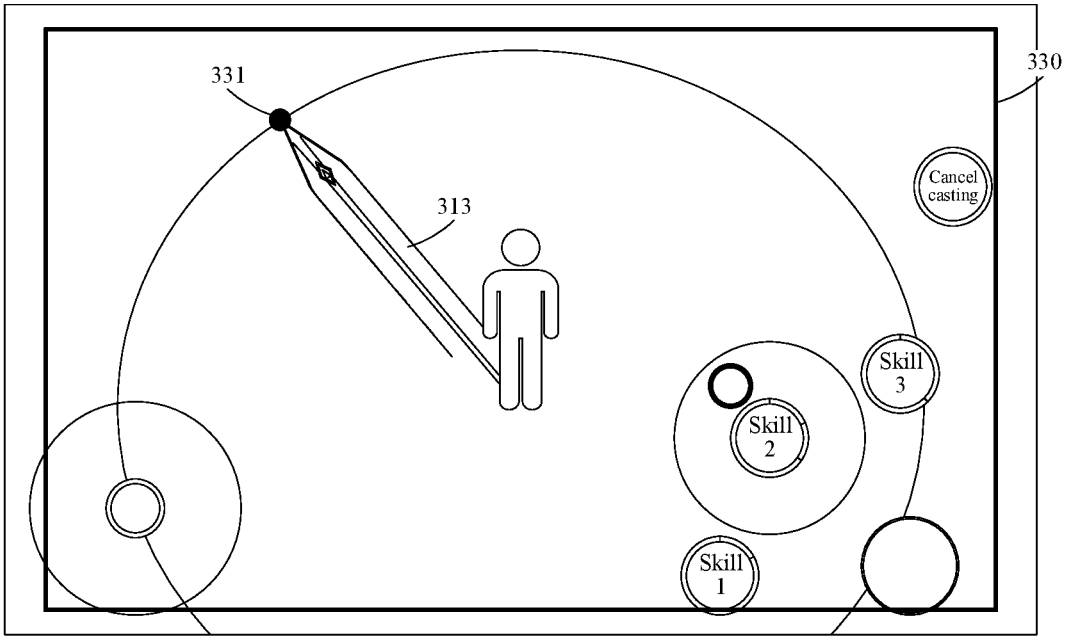
FIG. 17 is a schematic diagram of a virtual environment picture according to another exemplary embodiment of this application.

Exemplarily, the visual field determining box is configured to indicate a visual field range of a virtual environment picture displayed in the UI. Exemplarily, the visual field determining box is defined according to a visual field range of a virtual environment picture displayed in the display screen of the terminal. Exemplarily, the visual field determining box is configured to encircle a region range currently displayed in the virtual environment. In order to facilitate calculations, the visual field determining box is usually set as a rectangle, and an aspect ratio of the rectangle is determined according to an aspect ratio of the UI or an aspect ratio of the display screen. Exemplarily, if some UI controls on the UI occlude the virtual environment picture, the shape of the visual field determining box may be set according to the shape of the UI controls. For example, as shown in FIG. 6, a minimap 321 occludes part of the virtual environment picture, a square of the minimap may be taken out from the rectangle to obtain a polygonal visual field determining box. Exemplarily, the visual field determining box is a rectangular box that is scaled down in the same proportion as the UI or the display screen. A scale-down ratio may be set freely. By disposing a visual field determining box smaller than a virtual environment picture, a UI control in the virtual environment picture can be not included in a visual field range, thereby improving the accuracy of a visual field range described by the visual field determining box. For example, as shown in FIG. 17, a visual field determining box 330 is slightly smaller than a virtual environment picture.

Exemplarily, the visual field determining box is a rectangular box that is disposed in a three-dimensional virtual environment and that is invisible in a virtual environment picture. That is, the user cannot see the visual field determining box in the virtual environment picture. Exemplarily, the visual field determining box is centered on a current observation position of the camera model and is parallel to a horizontal plane, and a frame line is perpendicular/parallel to an observing direction of the camera model. That is, the visual field determining box is a projection region of the virtual environment picture drawn on the ground of the virtual environment.

Exemplarily, a visual field determining box with the first observation position as a center point is named a first visual field determining box, and a visual field determining box with the second observation position as a center point is named a second visual field determining box.

Exemplarily, when the directional skill indicator is at least partially outside the first visual field determining box, the client determines that the directional skill indicator cannot be completely displayed in the virtual environment picture, and then determines the offset of the camera model according to a distance by which the directional skill indicator is at least partially outside the first visual field determining box. For example, if the directional skill indicator is at least partially outside the visual field determining box by 1 meter, the client controls the camera model to move 1 meter in the first direction, so that the directional skill indicator can be included in the visual field determining box, and the user can see the directional skill indicator completely in the virtual environment picture.

Figure 18:
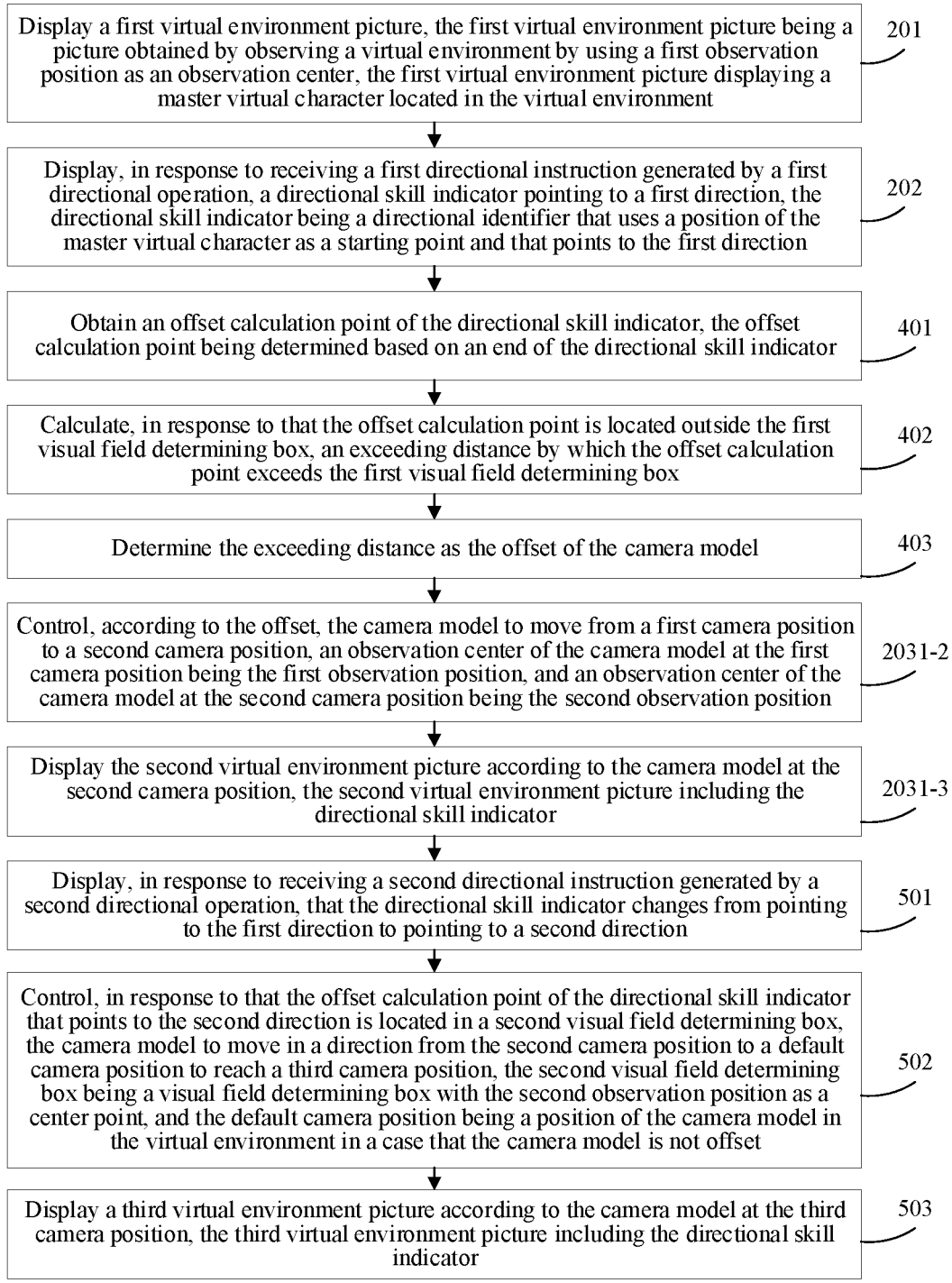
FIG. 18 is a flowchart of a method for displaying a virtual environment picture according to another exemplary embodiment of this application.

Exemplarily, FIG. 18 shows a method for obtaining the offset according to the visual field determining box. Step 2031-11 further includes step 401 to step 403. FIG. 18 further shows a method for controlling, according to the visual field determining box, the camera model that has been offset to return. Steps 501 to 503 are further included after step 2031-3.

Step 401: Obtain an offset calculation point of the directional skill indicator, the offset calculation point being determined based on an end of the directional skill indicator.

The offset calculation point is configured to determine a relative position relationship between the directional skill indicator and the visual field determining box. Exemplarily, a point is selected arbitrarily from the skill indicator as a reference point (offset calculation point) for determining whether the directional skill indicator is at least partially outside the visual field determining box. If the offset calculation point is outside the visual field determining box, a distance by which the directional skill indicator exceeds the visual field determining box is further calculated based on the offset calculation point. Exemplarily, the offset calculation point is a point located at or near the end of the directional skill indicator. Exemplarily, when a skill of the directional skill indicator is a skill that is cast on the entire map, and the directional skill indicator does not have an end, a point with a fixed distance to a starting point (an observation center point) may be used as the offset calculation point. Alternatively, it can be understood that the end of the directional skill indicator is an intersection with a boundary of the virtual environment, and a point with a fixed distance to the end is used as the offset calculation point.

Exemplarily, as shown in FIG. 17, an end 331 of a directional skill indicator 313 is determined as the offset calculation point.

Step 402: Calculate, in response to that the offset calculation point is located outside the first visual field determining box, an exceeding distance by which the offset calculation point exceeds the first visual field determining box.

Exemplarily, if the offset calculation point is outside the first visual field determining box, the relatively complete directional skill indicator cannot be displayed in the first virtual environment picture.

The offset of the camera model is calculated based on the offset calculation point and the first visual field determining box. Exemplarily, an intersection between a line connecting a position of the master virtual character and the offset calculation point and the first visual field determining box may be taken to calculate a distance from the offset calculation point to the intersection, to obtain the distance by which the directional skill indicator exceeds the visual field determining box, and the camera model is then moved in the first direction by the distance.

Exemplarily, if a rectangular coordinate system parallel to the ground is established in a direction parallel/perpendicular to frame lines of the visual field determining box, the frame lines of the visual field determining box are expressed as four straight lines in the form of x=a or y=b on the rectangular coordinate system. A transverse vertical distance and a longitudinal vertical distance from the offset calculation point to the frame lines of the visual field determining box are calculated by using coordinates of the offset calculation point. For example, if four frame lines of the first visual field determining box are x=−2, x=2, y=1, y=1, and the coordinates of the offset calculation point are (3, 4), the longitudinal offset distance from the offset calculation point to the first visual field determining box is 4-1=3, and the transverse offset distance is 3−2=1, the exceeding distance is represented by a vector as (1, 3), and the client can control the camera model moves by the vector (1, 3) to the second camera position.

Step 403: Determine exceeding distance and the first direction as the moving distance and the moving direction of the offset of the camera model.

The client uses the exceeding distance calculated in step 402 as the offset of the camera model, and obtains the second camera position through a calculation according to the first camera position and the offset. Exemplarily, when the offset is a direction vector, the second camera position is obtained by adding the offset to the first camera position.

Step 501: Display, in response to receiving a second directional instruction generated by a second directional operation, that the directional skill indicator changes from pointing to the first direction to pointing to a second direction.

Exemplarily, if the camera model has been offset to the second camera position according to the directional skill indicator pointing to the first direction, the user controls the directional skill indicator to point to the second direction. An offset calculation point of the directional skill indicator pointing to the first direction intersects the second visual field determining box, and the directional skill indicator pointing to the second direction is located within the second visual field determining box. That is, when the directional skill indicator is no longer exactly against a border of a visual field range of the user, the client needs to control the position of the camera model to pull back to the default position, so that the directional skill indicator is always exactly against the border of the visual field range of the user, until the camera model is pulled back to the default position.

Figure 19:
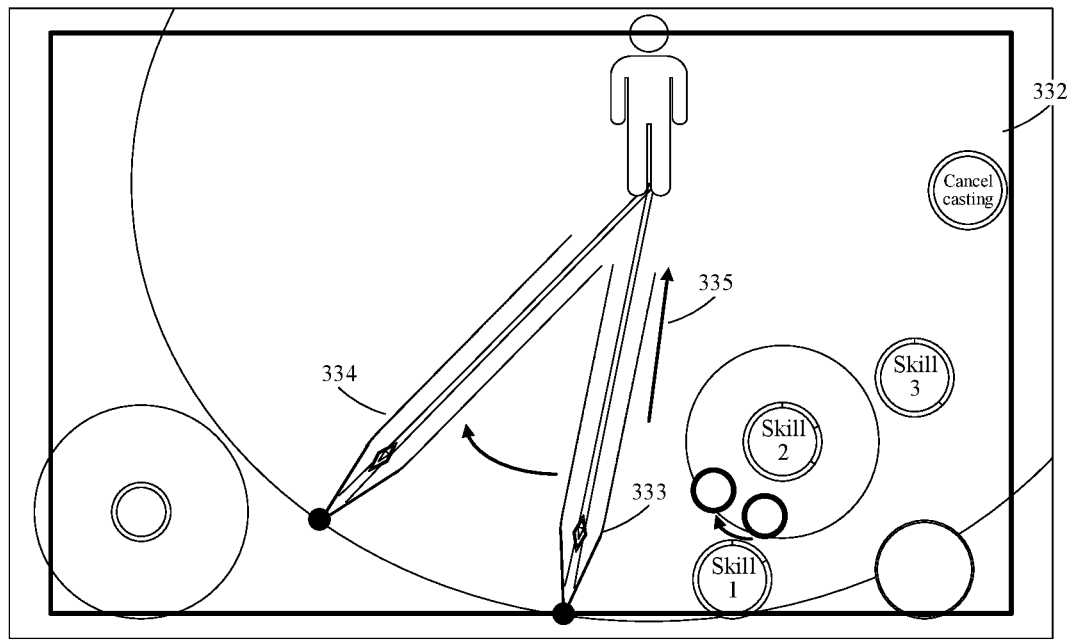
FIG. 19 is a schematic diagram of a virtual environment picture according to another exemplary embodiment of this application.

For example, as shown in FIG. 19, the directional skill indicator is changed from an original first direction 333 to a second direction 334, so that the offset calculation point is changed from being exactly against a frame line of a second visual field determining box 332 to being located within the second visual field determining box 332. Alternatively, the directional skill indicator retracts in a direction 335, and the length becomes shorter, so that the offset calculation point is located within the second visual field determining box 332. The client needs to control the camera model to return to the default position, so that the offset calculation point is always located on a frame line of the visual field determining box, until the camera model returns to the default position.

Step 502: Control, in response to that the offset calculation point of the directional skill indicator that points to the second direction is located in a second visual field determining box, the camera model to move in a direction from the second camera position to a default camera position to reach a third camera position, the second visual field determining box being a visual field determining box with the second observation position as a center point, and the default camera position being a position of the camera model in the virtual environment when the camera model is not offset.

Exemplarily, in response to that the offset calculation point of the directional skill indicator that points to the second direction is relocated in the second visual field determining box, the camera model is controlled to move in the direction from the second camera position to the default camera position to reach the third camera position. That is, when the directional skill indicator changes from pointing to the first direction to pointing to the second direction, the end of the directional skill indicator is no longer against the second visual field determining box, but returns to the second visual field determining box. In this case, the camera model is controlled to pull back in the direction of the default camera position.

Exemplarily, the default camera position is the foregoing default position. A case that the offset calculation point is located within the second visual field determining box is that the offset calculation point is located within the second visual field determining box and is not on a frame line of the second visual field determining box.

Exemplarily, the client controls the camera position to retract toward the default camera position, and stops moving the camera position until the offset calculation point is against a frame line of a visual field determining box at a current position again. Alternatively, the camera position stops moving until the camera model is moved back to the default camera position.

Figure 20:
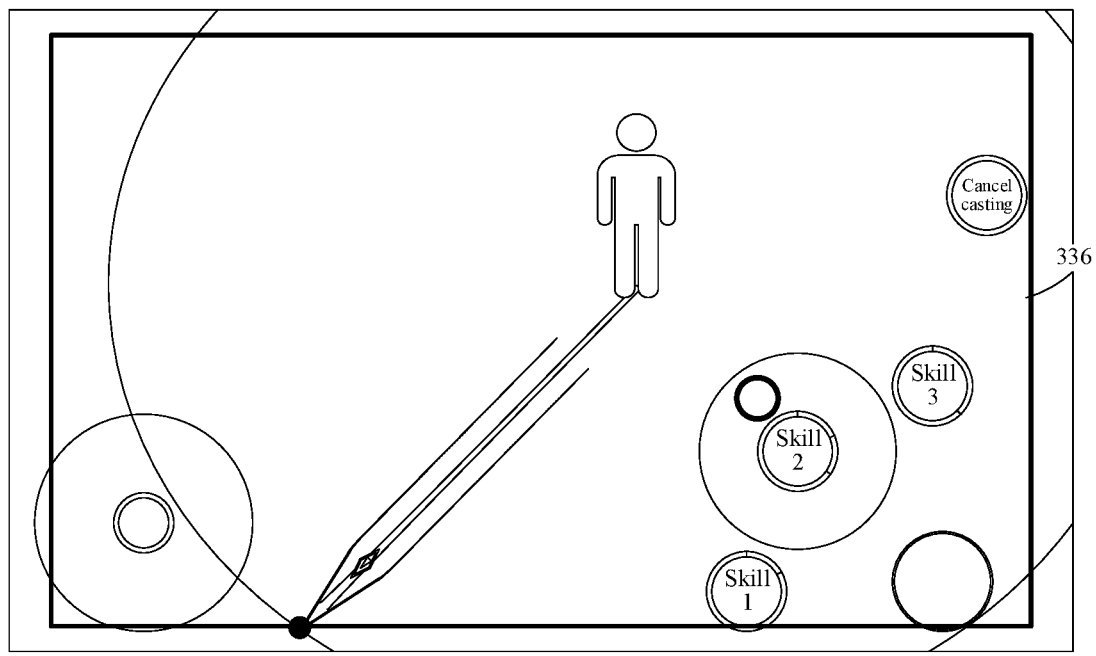
FIG. 20 is a schematic diagram of a virtual environment picture according to another exemplary embodiment of this application.

For example, as shown in FIG. 19, when the offset calculation point is located within the second visual field determining box, the camera model is controlled to move to the default position until the camera model is moved to the third camera position, so that the offset calculation point is against a frame line of a third visual field determining box 336 again as shown in FIG. 20.

Step 503: Display a third virtual environment picture according to the camera model at the third camera position, the third virtual environment picture including the directional skill indicator.

An observation center of the camera model at the third camera position is a third observation position, the offset calculation point of the directional skill indicator in the third virtual environment picture intersects a side line of a third visual field determining box, and the third visual field determining box is a visual field determining box with the third observation position as a center point.

Exemplarily, if an offset calculation point of the directional skill indicator pointing to a third direction exceeds the second visual field determining box, the offset of the camera model is still calculated in the above manner. The camera model continues to be controlled to offset outwards, so that the offset calculation point does not exceed the visual field determining box.

Exemplarily, if the user controls the master virtual character to cast a skill, or the user cancels an aiming operation, the client sets the offset of the camera model to zero and controls the camera model to return to the default camera position.

Based on the above, in the method provided in this embodiment, the visual field determining box is disposed in the virtual environment to determine a moving offset of the camera model according to a vertical distance by which the directional skill indicator exceeds the visual field determining box, thereby accurately controlling the camera model to move to the target camera position, preventing occlusion of a UI control from affecting the display of the directional skill indicator, so that the directional skill indicator is completely displayed in the virtual environment picture, which helps to improve the accuracy of casting a skill, reduce the time to aim at a target, avoid the client from performing more invalid calculations during an aiming process, and improve the running efficiency of the client and further improve the man-machine interaction efficiency of skill aiming.

In the method provided in this embodiment, the camera model is further controlled to move by disposing the visual field determining box and according to a position relationship between the directional skill indicator and the visual field determining box, so that the observation center of the virtual environment picture can be moved more flexibly according to the directional skill indicator, thereby quickly displaying the directional skill indicator completely in the virtual environment picture, avoiding the client from performing more invalid operations during an aiming process, and improving the running efficiency of the client.

In the method provided in this embodiment, when the end of the directional skill indicator is located within the visual field determining box and does not intersect a frame, the camera model is further controlled to move to a default camera position before the offset, and the camera model is pulled back, so that the end of the directional skill indicator and an edge of the visual field determining box always intersect, until the camera model returns to the default camera position. In this way, the camera model is controlled according to a position of the directional skill indicator in an original virtual environment picture to achieve a "spring-like" offset or retracting effect, and the continuity during the offset of the camera model is improved when the directional skill indicator moves.

The second method is to calculate the offset of the camera model based on the first direction. The first direction is a direction pointed by the directional skill indicator.

Figure 21:
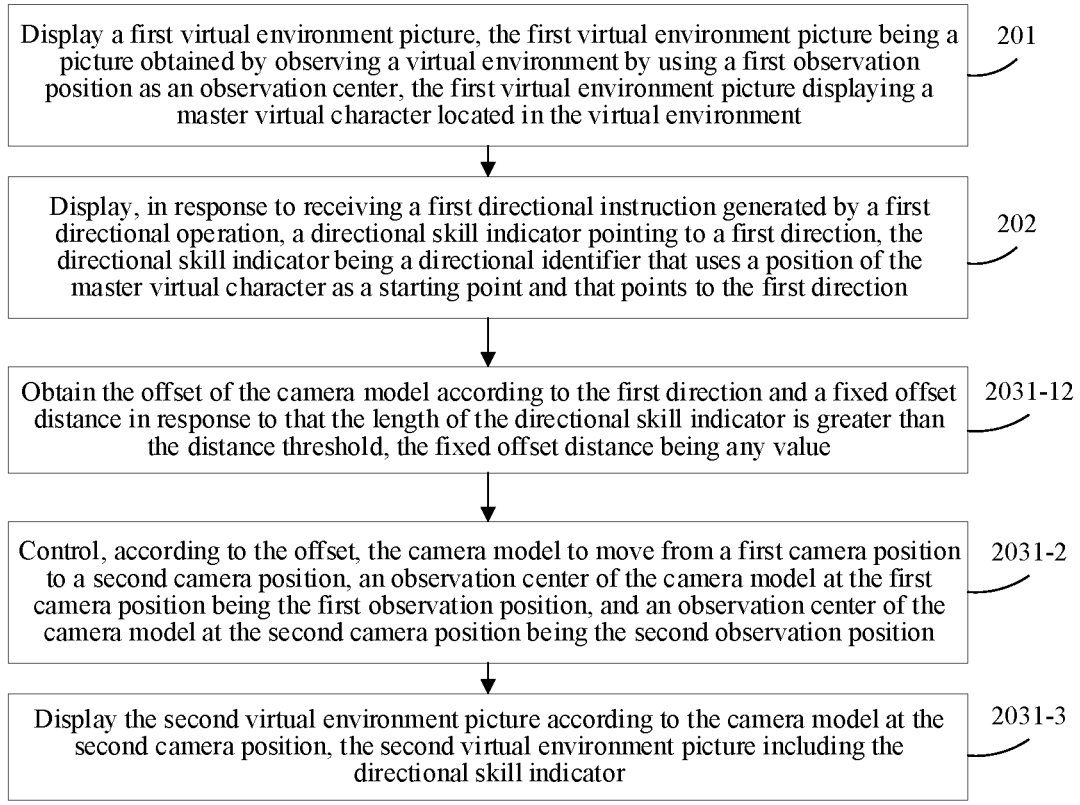
FIG. 21 is a flowchart of a method for displaying a virtual environment picture according to another exemplary embodiment of this application.

FIG. 21 is a flowchart of a method for displaying a virtual environment picture according to an exemplary embodiment of this application. The method may be performed by a client running on any terminal in FIG. 1. The client is a client supporting a virtual environment. Based on the exemplary embodiments shown in FIG. 12, step 2031-1 includes step 2031-12.

Step 2031-12: Obtain the offset of the camera model according to the first direction and a fixed offset distance in response to that the length of the directional skill indicator is greater than the distance threshold, the fixed offset distance being any value.

The offset is calculated according to the first direction. The fixed offset distance is a preset offset distance. For example, if the fixed offset distance is ten meters, the client directly controls, according to the first direction pointed by the directional skill indicator, the camera model to move ten meters in the first direction to reach the second camera position.

Figure 22:
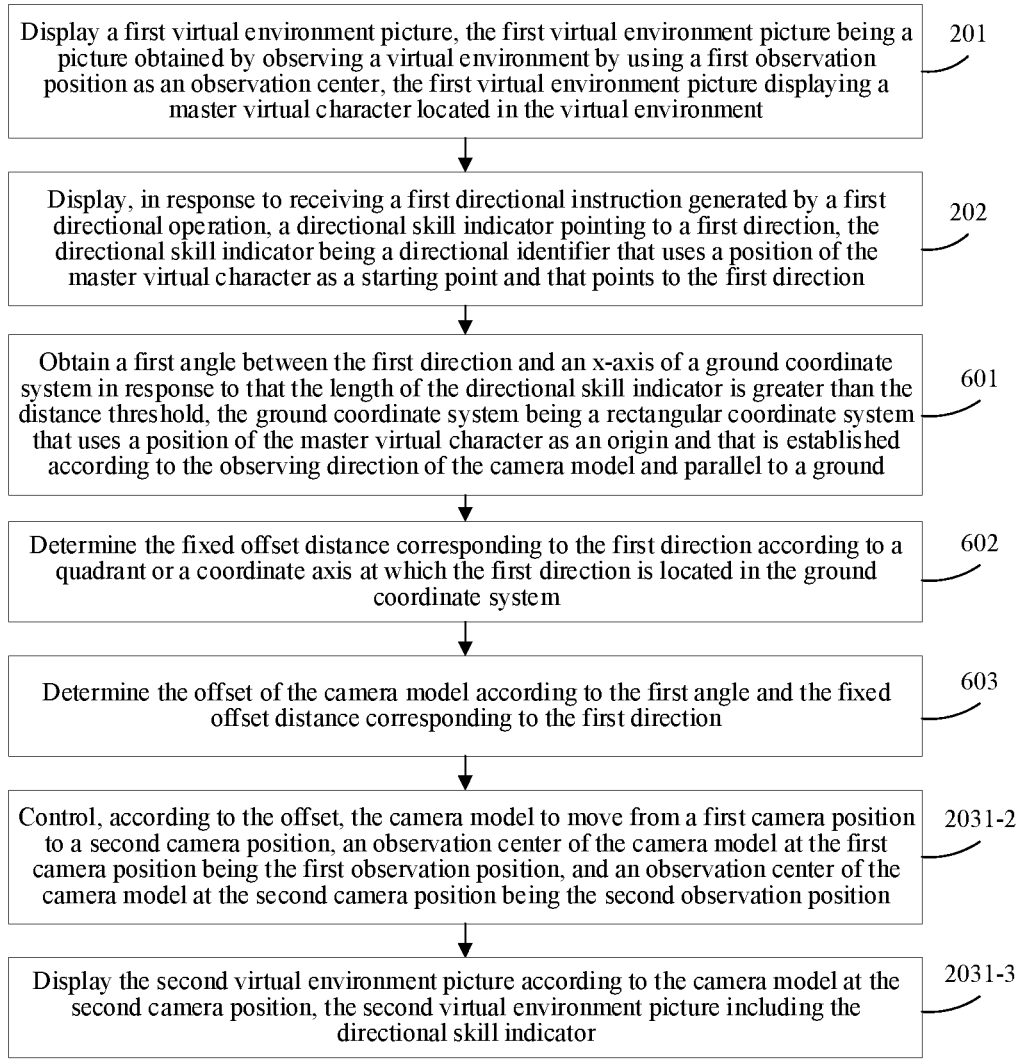
FIG. 22 is a flowchart of a method for displaying a virtual environment picture according to another exemplary embodiment of this application.

Exemplarily, in order to more accurately control an offset distance of the camera model in each direction, respective fixed offset distances are set in four directions: up, down, left, and right. As shown in FIG. 22, step 2031-12 further includes step 601 to step 603.

Step 601: Obtain a first angle between the first direction and an x-axis of a ground coordinate system in response to that the length of the directional skill indicator is greater than the distance threshold, the ground coordinate system being a rectangular coordinate system that uses a position of the master virtual character as an origin and that is established according to the observing direction of the camera model and parallel to a ground.

Exemplarily, the ground coordinate system is a rectangular coordinate system that uses the position of the master virtual character as an origin, a right direction perpendicular to the observing direction of the camera model as a positive semi-axis of the x-axis, and a forward direction parallel to the observing direction as a positive semi-axis of the y-axis, and is parallel to the ground (a horizontal plane) of the virtual environment.

Exemplarily, the first angle is an angle between the first direction and a horizontal direction. The horizontal direction is a direction perpendicular to the observing direction of the camera model and parallel to the horizontal plane. Exemplarily, the first angle ranges from 0° to 90°. Exemplarily, the first angle may alternatively range from 0° to 360°. However, corresponding sine and cosine values need to be absolute values.

Figure 23:
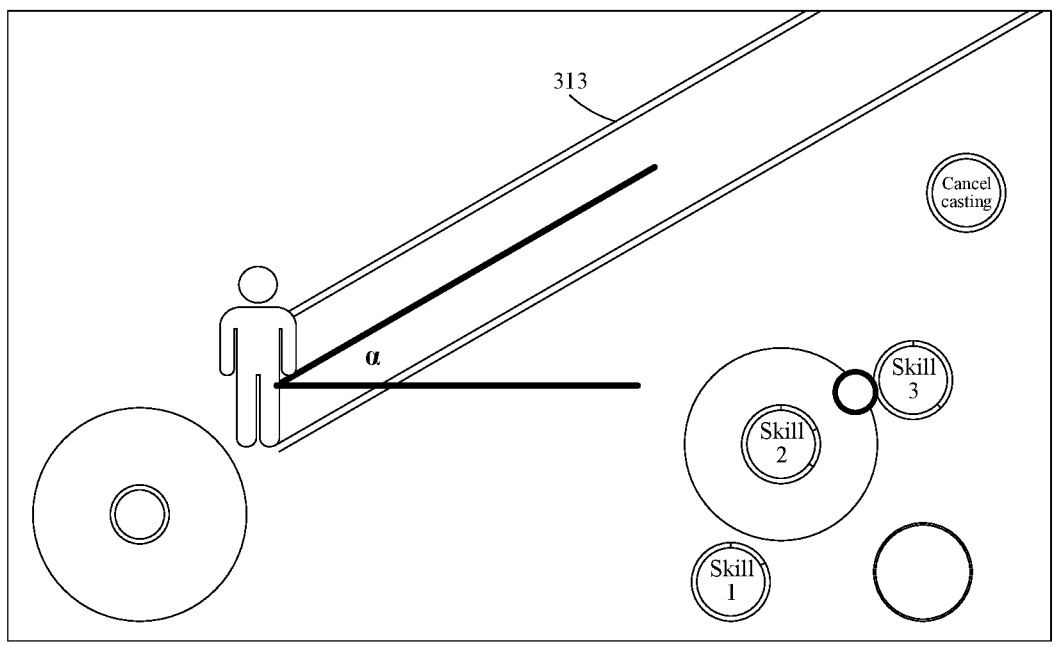
FIG. 23 is a schematic diagram of a virtual environment picture according to another exemplary embodiment of this application.

For example, as shown in FIG. 23, there is a first direction pointed by a directional skill indicator 313 in a virtual environment picture, and a first angle α between the first direction and a horizontal direction.

Step 602: Determine the fixed offset distance corresponding to the first direction according to a quadrant or a coordinate axis at which the first direction is located in the ground coordinate system.

Exemplarily, the positive semi-axis of the y-axis of the ground coordinate system is the upper side, the negative semi-axis of the y-axis is the lower side, the positive semi-axis of the x-axis is the right side, and the negative semi-axis of the x-axis is the left side. If the first direction is in a first quadrant, the first direction corresponds to an upper offset distance and a right offset distance. If the first direction is in a second quadrant, the first direction corresponds to an upper offset distance and a left offset distance. If the first direction is in a third quadrant, the first direction corresponds to a lower offset distance and a left offset distance. If the first direction is in a fourth quadrant, the first direction corresponds to a lower offset distance and a right offset distance. If the first direction is on the positive semi-axis of the x-axis, the first direction corresponds to the right offset distance. If the first direction is on the negative semi-axis of the x-axis, the first direction corresponds to the left offset distance. If the first direction is on the positive semi-axis of the y-axis, the first direction corresponds to the upper offset distance. If the first direction is on the negative semi-axis of the y-axis, the first direction corresponds to the lower offset distance.

Step 603: Determine the offset of the camera model according to the first angle and the fixed offset distance corresponding to the first direction.

Exemplarily, after obtaining the fixed offset distance corresponding to the first direction, the client can directly control the camera model to move by the fixed offset distance. For example, if the fixed offset distance corresponding to the first direction includes a right offset distance of 10 meters and an upper offset distance of 10 meters, the offset is (10, 10).

Exemplarily, the client may further exactly determine the offset according to sine and cosine values of the first angle.

Figure 24:
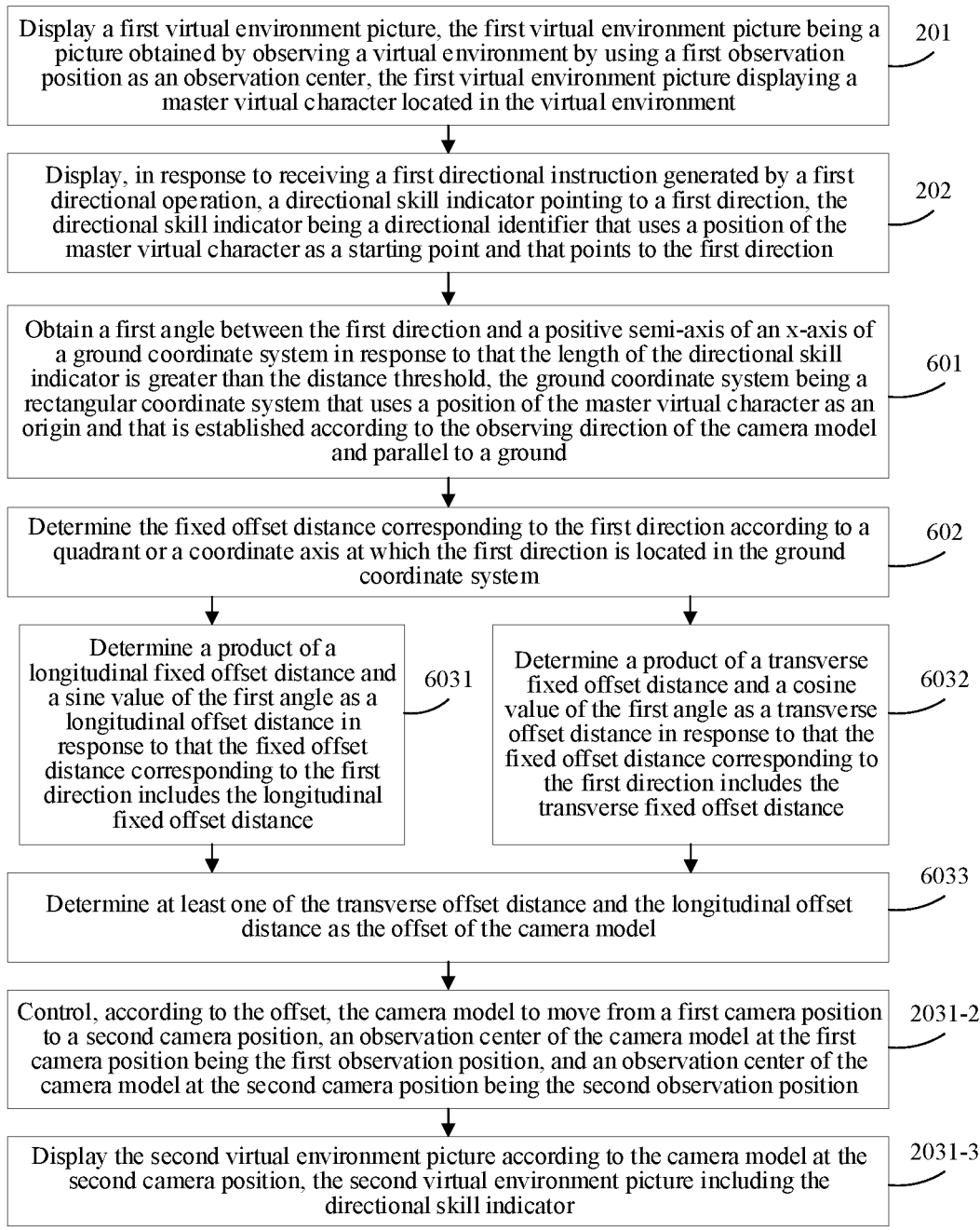
FIG. 24 is a flowchart of a method for displaying a virtual environment picture according to another exemplary embodiment of this application.

Exemplarily, the fixed offset distance includes at least one of a longitudinal fixed offset distance and a transverse fixed offset distance. The longitudinal fixed offset distance includes at least one of the upper offset distance and the lower offset distance. The transverse fixed offset distance includes at least one of the left offset distance and the right offset distance. As shown in FIG. 24, step 603 further includes step 6031 to step 6033.

Step 6031: Determine a product of the longitudinal fixed offset distance and a sine value of the first angle as a longitudinal offset distance in response to that the fixed offset distance corresponding to the first direction includes the longitudinal fixed offset distance.

If the fixed offset distance corresponding to the first direction has a fixed offset distance in a longitudinal direction, for example, an upper offset distance or a lower offset distance, the client multiplies the longitudinal fixed offset distance by the sine value of the first angle to obtain the longitudinal offset distance of the camera model.

Step 6032: Determine a product of the transverse fixed offset distance and a cosine value of the first angle as a transverse offset distance in response to that the fixed offset distance corresponding to the first direction includes the transverse fixed offset distance.

If the fixed offset distance corresponding to the first direction has a fixed offset distance in a transverse direction, for example, a left offset distance or a right offset distance, the client multiplies the transverse fixed offset distance by the cosine value of the first angle to obtain the transverse offset distance of the camera model.

Step 6033: Determine the offset of the camera model according to at least one of the transverse offset distance and the longitudinal offset distance.

For example, as shown in FIG. 23, if the first angle is 30°, the first direction points to the upper right, the upper offset distance is preset to 4, and the right offset distance is preset to 2, the transverse offset distance=2*cos 30°≈1.732, the longitudinal offset distance=4*sin 30°=2, and the offset of the camera model is (1.732, 2).

Figure 25:
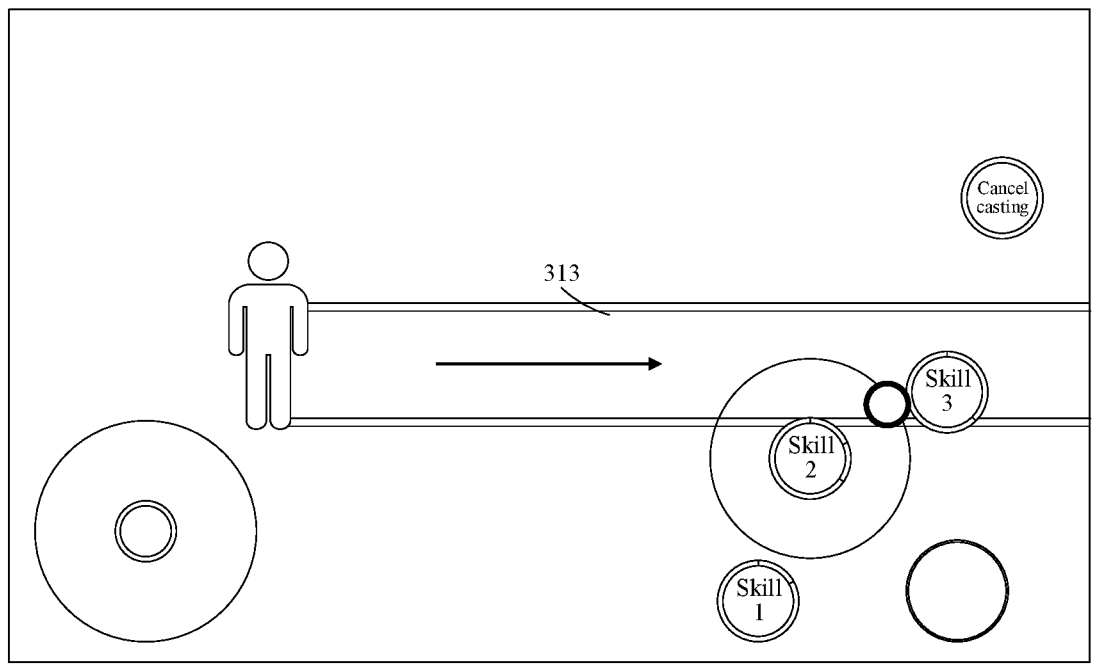
FIG. 25 is a schematic diagram of a virtual environment picture according to another exemplary embodiment of this application.

For example, as shown in FIG. 25, if the first angle is 0°, the first direction points to the right, and the right offset distance is preset to 4, the transverse offset distance=4*cos 0°=4, the longitudinal offset distance=4*sin 0°=0, and the offset of the camera model is (4, 0).

Based on the above, in the method provided in this embodiment, an offset distance in a specified direction is set for each skill. When the skill is cast, an offset of a camera model is determined according to a product of a trigonometric function value (a sine value or a cosine value) corresponding to an angle between a skill cast direction and a horizontal direction and an offset distance, so that the camera model is accurately offset in the skill cast direction according to the offset, and a directional skill indicator can be displayed more completely in a virtual picture, which helps to improve the accuracy of casting the skill. In this case, invalid operations performed by a client during an aiming process are reduced, and the running efficiency of the client is improved.

Exemplarily, exemplary embodiments in which the camera model is offset in combination of moving a position of the camera model in another manner and moving the position of the camera model based on a directional skill indicator are described.

Figure 26:
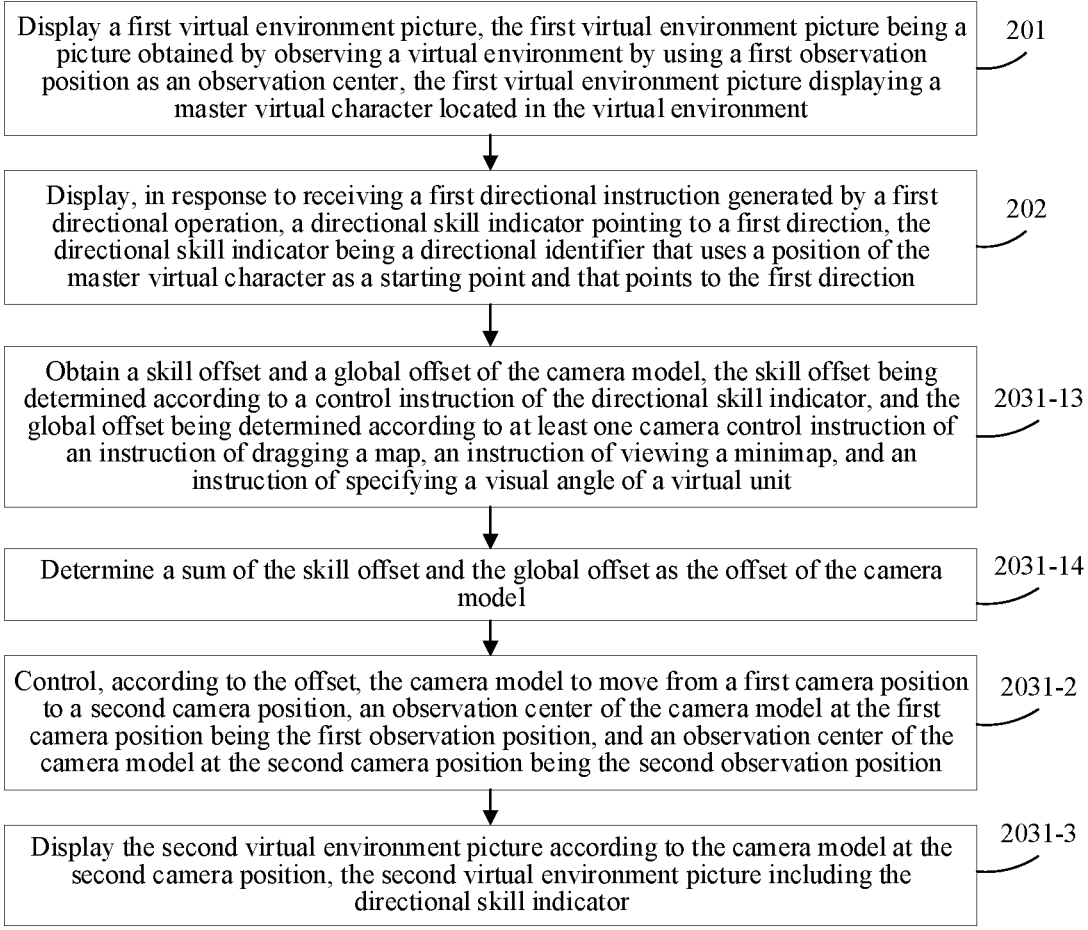
FIG. 26 is a flowchart of a method for displaying a virtual environment picture according to another exemplary embodiment of this application.

FIG. 26 is a flowchart of a method for displaying a virtual environment picture according to an exemplary embodiment of this application. The method may be performed by a client running on any terminal in FIG. 1. The client is a client supporting a virtual environment. Based on the exemplary embodiments shown in FIG. 12, step 2031-1 includes step 2031-13 and step 2031-14.

Step 2031-13: Obtain a skill offset and a global offset of the camera model, the skill offset being determined according to a control instruction of the directional skill indicator, and the global offset being determined according to at least one camera control instruction of an instruction of dragging a map, an instruction of viewing a minimap, and an instruction of specifying a visual angle of a virtual unit.

Figure 27:
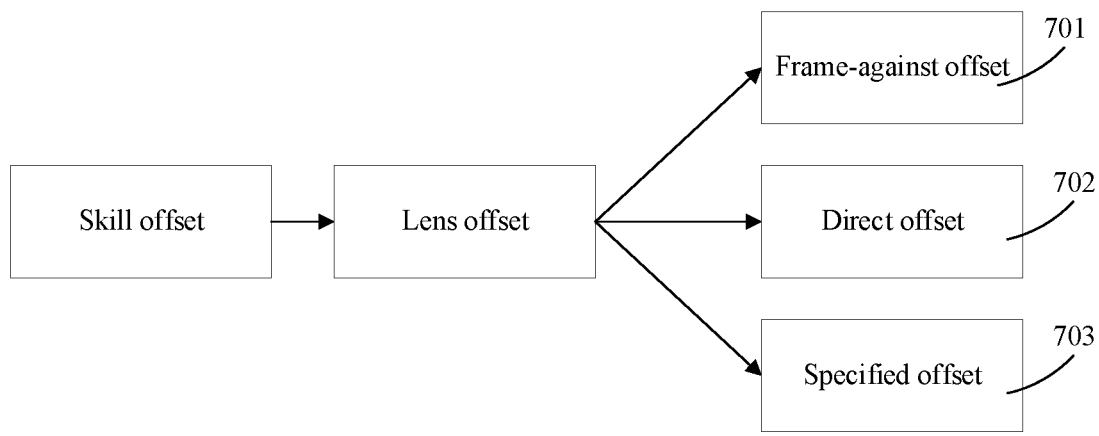
FIG. 27 is a flowchart of a method for displaying a virtual environment picture according to another exemplary embodiment of this application.
Figure 28:
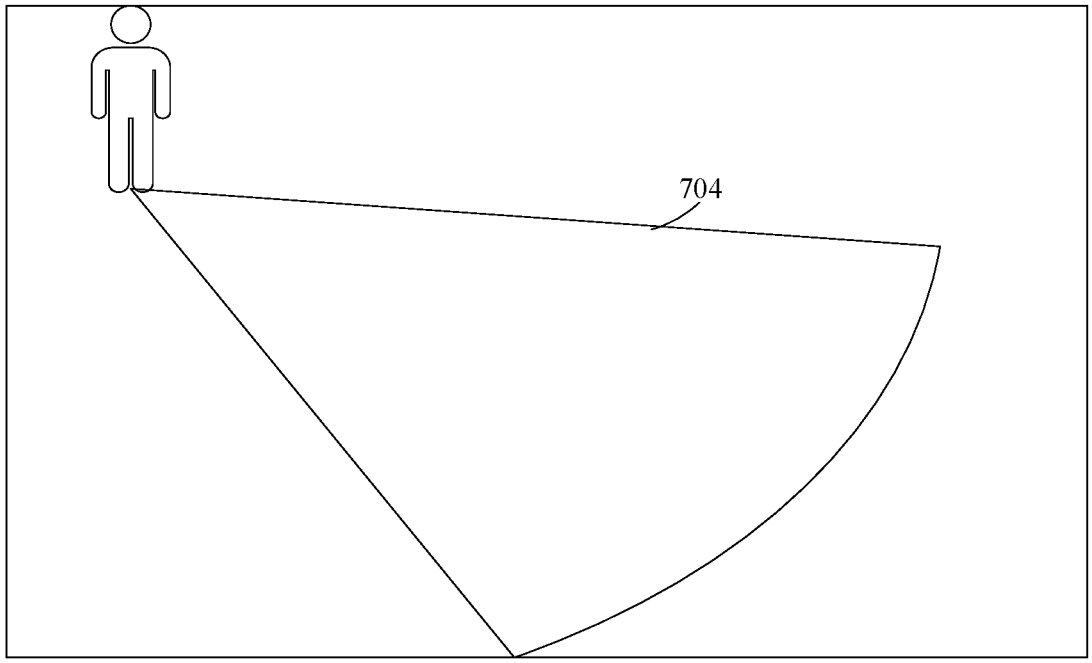
FIG. 28 is a schematic diagram of a virtual environment picture according to another exemplary embodiment of this application.

The skill offset is an offset calculated in at least one of the two offset calculation manners provided in the foregoing embodiment. The skill offset is used for measuring an offset generated when a directional skill indicator is displayed more completely in a virtual environment picture. For example, as shown in FIG. 27, skill offsets include an offset calculated in a frame-against offset 701 manner, an offset calculated in a direct offset 702 manner, and an offset calculated in a specified offset 703 manner. The frame-against offset 701 is an offset calculated based on the visual field determining box. The direct offset 702 is an offset calculated based on the first direction and the fixed offset distance. The specified offset 703 is a specified offset manner formulated for some specific skills. For example, as shown in FIG. 28, if an action range of a skill is a fan shaped, a skill indicator 704 is displayed as a fan shape. By specifying an offset, a side line of the fan shape always intersects a side line of a virtual environment picture when a user uses the skill indicator 704 to aim.

Figure 29:
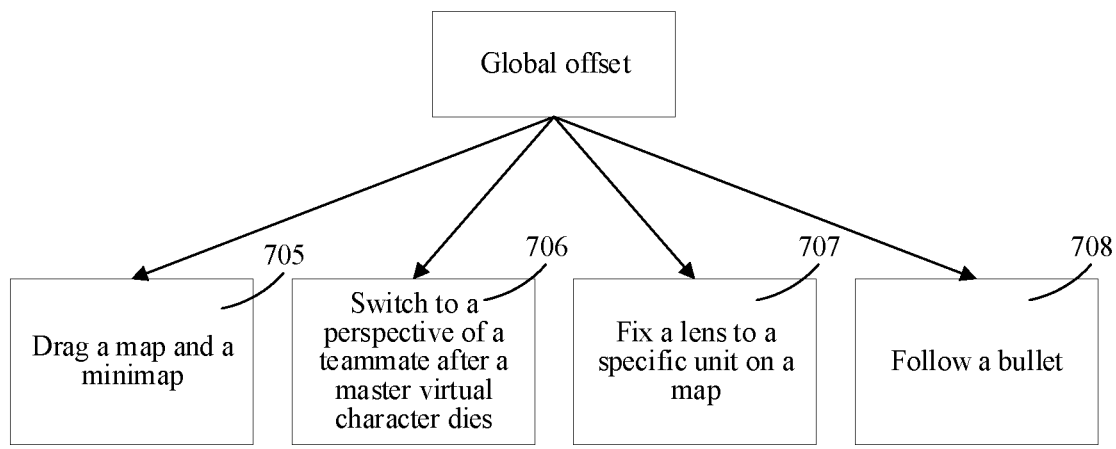
FIG. 29 is a flowchart of a method for displaying a virtual environment picture according to another exemplary embodiment of this application.

The global offset is an offset generated according to another operation through which the position of the camera model can be controlled to move. For example, as shown in FIG. 29, the ways to generate the global offset include: dragging a map and a minimap 705, switching to a perspective of a teammate when a master virtual character dies 706, fixing a lens to a specific unit on a map 707, and following a bullet 708. For example, a user can switch a perspective by dragging the map and the mini map. The master virtual character continues to observe the virtual environment from a perspective of a teammate. The perspective is locked on a three-dimensional model in the virtual environment, for example, a defensive tower, a crystal, grass, or the ground. The perspective of the camera model follows a cast bullet.

Exemplarily, the client uses two separate calculation modules to calculate the skill offset and the global offset of the camera model respectively, and finally sums the two offsets calculated by the two calculation modules, to obtain a final offset of the camera model. Next, the client controls the camera model to offset according to the final offset.

Step 2031-14: Determine a sum of the skill offset and the global offset as the offset of the camera model.

Based on the above, in the method provided in this embodiment, the final offset of the camera model is determined by combining offsets of the camera model that are corresponding to a global offset manner and a skill offset manner, that is, the final position of the camera model, so that camera model offset effects generated by different operations are calculated separately, which simplifies the calculation difficulty and reduces a probability of a calculation error. In this case, a movement of the camera model is controlled according to different offsets, thereby reducing invalid operations performed by the client during an aiming process, and improving the running efficiency of the client.

Figure 30:
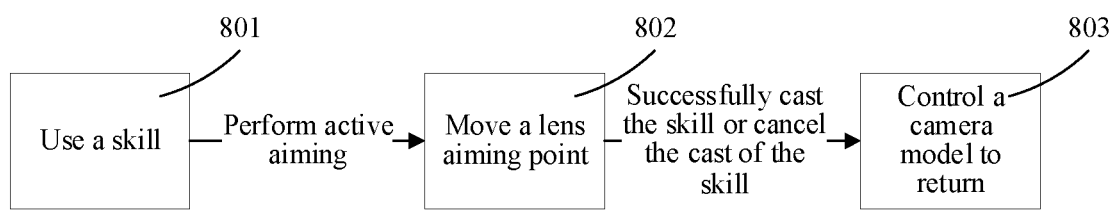
FIG. 30 is a flowchart of a method for displaying a virtual environment picture according to another exemplary embodiment of this application.

FIG. 30 is a flowchart of a method for displaying a virtual environment picture according to an exemplary embodiment of this application. The method may be performed by a client running on any terminal in FIG. 1. The client is a client supporting a virtual environment. First, step 801: A user controls a master virtual character to use a skill, and actively aims according to a directional skill indicator displayed in a virtual environment picture. Next, step 802: The client controls, according to the directional skill indicator, a lens aiming point to move (a camera model), so that the directional skill indicator is displayed more completely in the virtual environment picture. Finally, step 803: Control the camera model to return when the skill is successfully cast or the user cancels the cast of the skill.

Figure 31:
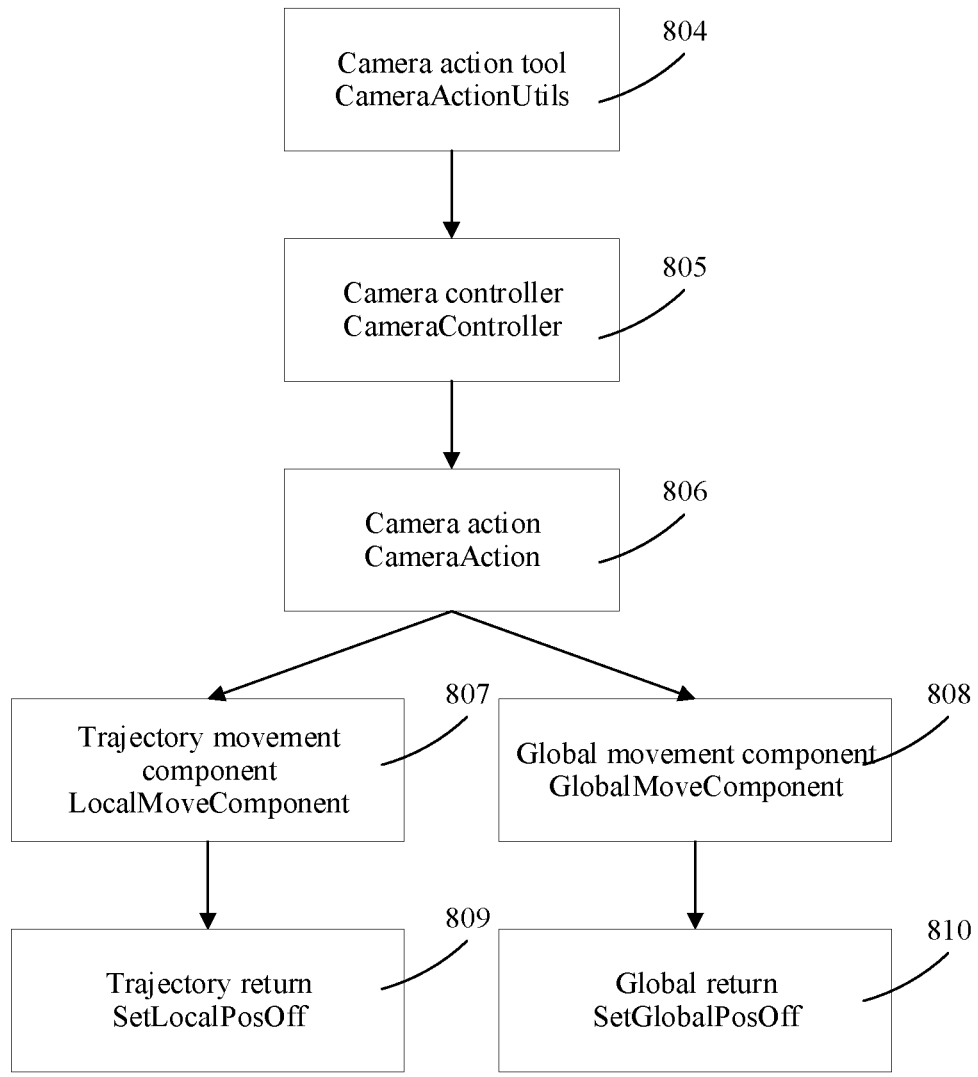
FIG. 31 is a flowchart of a method for displaying a virtual environment picture according to another exemplary embodiment of this application.

FIG. 31 is a schematic diagram of an algorithm module for implementing a method for displaying a virtual environment picture according to an exemplary embodiment of this application.

CameraActionUtils (camera action tool) 804, also named lens module tool set, provides lens interfaces of various operations to the public, the operations including moving, rotating, lifting a lens, or the like.

CameraController (camera controller) 805, also named lens controller, is mainly configured to manage various data of a camera (a lens) and provide respective interfaces inside a lens module.

CameraAction (camera action) 806, which is a lens solution, is configured to provide a movement solution of a camera model, including: a differential motion, a smooth damped motion, a uniform motion, or the like.

MoveComponent (moving component) is to process a lens offset, obtain solution parameters from CameraAction, and move a lens (the camera model) every frame until the camera model reaches a destination position. Exemplarily, MoveComponent includes LocalMoveComponent (a trajectory movement component) 807 and GlobalMoveComponent (a global movement component) 808. LocalMoveComponent is configured to control a movement based on a skill offset, and GlobalMoveComponent is configured to control a movement based on a global offset.

SetLocalPosOff (trajectory return) 809 is configured to control the camera model that is offset based on a skill offset to return to a default camera position.

SetGlobalPosOff (global return) 810 is configured to control the camera model that is offset based on a global offset to return to the default camera position.

Figure 32:
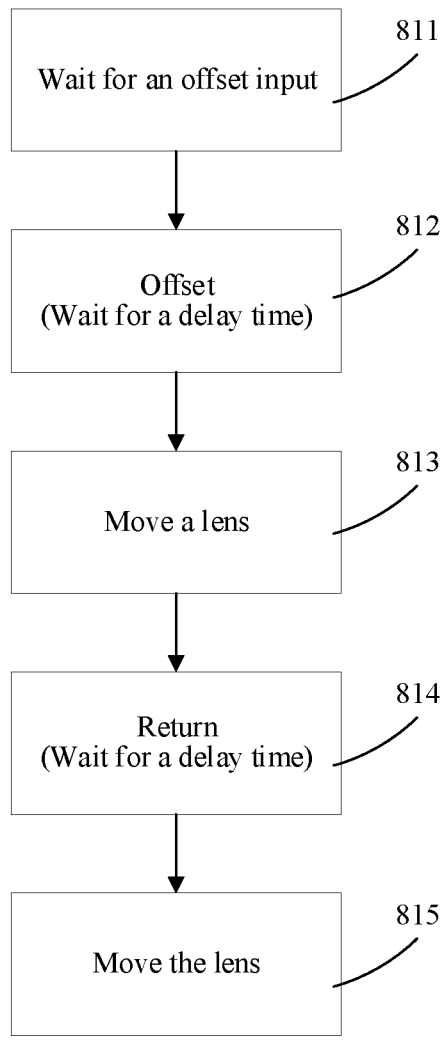
FIG. 32 is a flowchart of a method for displaying a virtual environment picture according to another exemplary embodiment of this application.

Exemplarily, in the method for displaying a virtual environment picture provided in this embodiment, there is a waiting time every time a position of the camera model is moved, and the camera model is controlled to move after the waiting time has passed. FIG. 32 is a flowchart of a method for displaying a virtual environment picture according to an exemplary embodiment of this application. The method may be performed by a client running on any terminal in FIG. 1. The client is a client supporting a virtual environment. Step 811: A client waits for an offset input, and waits for a user to perform an operation of calling out a directional skill indicator. Step 812: The client determines that a camera model needs to be offset, and waits for a delay time of an offset. Step 813: Control, after the delay time has passed, the camera model to offset. Step 814: The client determines that the camera model needs to return, and waits for a delay time of a return. Step 815: Control, after the delay time has passed, the camera model to return, and wait for an offset input again.

Based on the above, in the method provided in this embodiment, a delay time is added before the camera model is controlled to offset. When the camera model needs to be offset, the camera model is not controlled to offset immediately, so that there is a visual buffer time, thereby achieving a better picture effect.

The foregoing method is described based on a game application scenario in the foregoing embodiments, and the following is an exemplary description of the foregoing method based on a military simulation application scenario.

The simulation technology is a model technology in which a system behavior or process is reflected by using software and hardware through an experiment of simulating a real world.

A military simulation program is a program specially constructed for military application by using the simulation technology, which performs quantitative analysis on battle elements such as sea, air, and land, weapon equipment performance, battle actions, and the like, to accurately simulate a battlefield environment, and present a battlefield situation, thereby implementing battle system evaluation and decision aids.

In an example, soldiers establish a virtual battlefield on a terminal on which the military simulation program is located, and fight in teams. The soldier controls a virtual object in a virtual battlefield environment to perform at least one operation of standing, squatting, sitting down, lying on the back, lying prone, lying on the side, walking, running, climbing, driving, shooting, throwing, attacking, being injured, detecting, close combat and other actions in the virtual battlefield environment. The virtual battlefield environment includes at least one of the following nature forms: a plain, a mountain, a plateau, a basin, a desert, a river, a lake, a sea, vegetation, and site forms of a building, a vehicle, ruins, a training ground, and the like. The virtual object includes a virtual person, a virtual animal, a cartoon person, or the like. Each virtual object owns a shape and size in a three-dimensional virtual environment, and occupies some space in the three-dimensional virtual environment.

Based on the above situation, in an example, a soldier A controls a master virtual character a to move in a virtual environment. When the soldier A controls the master virtual character a to aim in a first direction, a directional skill indicator corresponding to an aiming operation is displayed in a virtual environment picture. When the directional skill indicator is at least partially outside a display range of a current virtual environment picture, a camera model is controlled to move by a specific distance to an aiming direction, so that the directional skill indicator is displayed in the virtual environment picture more completely. When the soldier A cancels the aiming operation or the skill has been cast, a military simulation program controls the camera model to slowly return to a default position. Exemplarily, the default position is a position corresponding to an observation center when the master virtual character a is used as the observation center.

Based on the above, in this embodiment, the foregoing method for displaying a virtual environment picture is applied to the military simulation program, and the directional skill indicator can be displayed completely in the virtual environment picture, which improves the aiming accuracy, so that soldiers are better trained. In addition, invalid operations performed by a client of the military simulation program during an aiming process are reduced, and the running efficiency of the client is improved.

The following describes apparatus embodiments of this application. For details not described in detail in the apparatus embodiments, reference may be made to the foregoing method embodiments.

Figure 33:
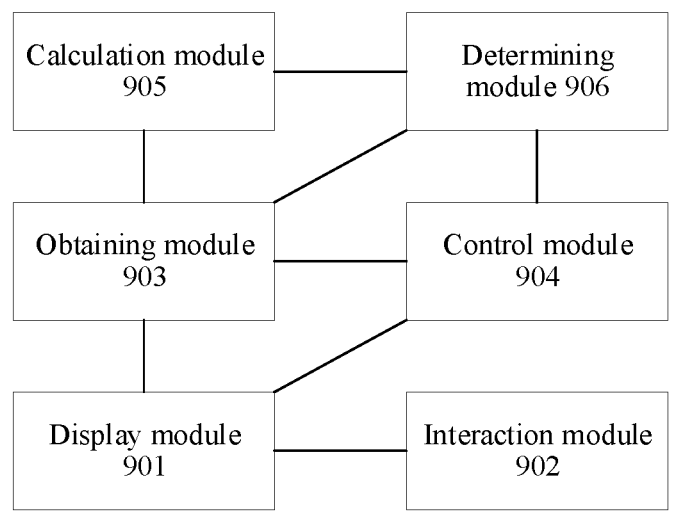
FIG. 33 is a block diagram of an apparatus for displaying a virtual environment picture according to an exemplary embodiment of this application.

FIG. 33 is a block diagram of an apparatus for displaying a virtual environment picture according to an exemplary embodiment of this application. The apparatus includes:

a display module 901, configured to display a first virtual environment picture, the first virtual environment picture being a picture obtained by observing a virtual environment by using a first observation position as an observation center, the first virtual environment picture displaying a master virtual character located in the virtual environment; and an interaction module 902, configured to receive a first directional operation to generate a first directional instruction, the display module 901 being further configured to display, in response to receiving the first directional instruction generated by the first directional operation, a directional skill indicator pointing to a first direction, the directional skill indicator being a directional identifier that uses a position of the master virtual character as a starting point and that points to the first direction;

the display module 901 being further configured to display a second virtual environment picture, the second virtual environment picture being a picture obtained by observing the virtual environment by using a second observation position as an observation center, the second virtual environment picture including the directional skill indicator, and the second observation position being in the first direction of the first observation position or in a surrounding region in the first direction.

In an exemplary embodiment, the display module 901 is configured to display the second virtual environment picture in response to that a length of the directional skill indicator is greater than a distance threshold, the distance threshold being a visual field threshold that uses the position of the master virtual character as a starting point in the first virtual environment picture and that is in the first direction.

In an exemplary embodiment, the first virtual environment picture and the second virtual environment picture are pictures captured by a camera model disposed in the virtual environment, and the observation center is an intersection of a ray emitted from a position of the camera model along an observing direction and the virtual environment; and the apparatus further includes:

an obtaining module 903, configured to obtain an offset of the camera model in response to that the length of the directional skill indicator is greater than the distance threshold, the offset being used for determining a moving direction and a moving distance of the camera model; and a control module 904, configured to control, according to the offset, the camera model to move from a first camera position to a second camera position, an observation center of the camera model at the first camera position being the first observation position, and an observation center of the camera model at the second camera position being the second observation position, the display module 901 being further configured to display the second virtual environment picture according to the camera model at the second camera position, the second virtual environment picture including the directional skill indicator.

In an exemplary embodiment, the offset is calculated according to a visual field determining box, and the visual field determining box is configured to represent a visual field of the camera model.

The obtaining module 903 is configured to obtain the offset of the camera model in response to that the directional skill indicator is at least partially outside a first visual field determining box and according to a distance by which the directional skill indicator exceeds the first visual field determining box, the first visual field determining box being a visual field determining box with the first observation position as a center point.

In an exemplary embodiment, the obtaining module 903 is configured to obtain an offset calculation point of the directional skill indicator, the offset calculation point being determined based on an end of the directional skill indicator;

the calculation module 905 is configured to calculate, in response to that the offset calculation point is located outside the first visual field determining box, an exceeding distance by which the offset calculation point is outside the first visual field determining box; and the determining module 906 is configured to determine the exceeding distance and the first direction as the moving distance and the moving direction of the offset of the camera model.

In an exemplary embodiment, the interaction module 902 is configured to receive a second directional operation to generate a second directional instruction;

the display module 901 is configured to display, in response to receiving the second directional instruction generated by the second directional operation, that the directional skill indicator changes from pointing to the first direction to pointing to a second direction;

the control module 904 is configured to control, in response to that the offset calculation point of the directional skill indicator that points to the second direction is located in a second visual field determining box, the camera model to move in a direction from the second camera position to a default camera position to reach a third camera position, the second visual field determining box being a visual field determining box with the second observation position as a center point, and the default camera position being a position of the camera model in the virtual environment when the camera model is not offset; and the display module 901 is configured to display a third virtual environment picture according to the camera model at the third camera position, the third virtual environment picture including the directional skill indicator, An observation center of the camera model at the third camera position is a third observation position, the offset calculation point of the directional skill indicator in the third virtual environment picture intersects a side line of a third visual field determining box, and the third visual field determining box is a visual field determining box with the third observation position as a center point.

In an exemplary embodiment, the offset is calculated according to the first direction; and the obtaining module 903 is configured to obtain the offset of the camera model according to the first direction and a fixed offset distance in response to that the length of the directional skill indicator is greater than the distance threshold, the fixed offset distance being any value.

In an exemplary embodiment, the obtaining module 903 is configured to obtain a first angle between the first direction and an x-axis of a ground coordinate system, the ground coordinate system being a rectangular coordinate system that uses the position of the master virtual character as an origin and that is established according to the observing direction of the camera model and parallel to a ground;

the determining module 906 is configured to determine the fixed offset distance corresponding to the first direction according to a quadrant or a coordinate axis at which the first direction is located in the ground coordinate system; and the determining module 906 is configured to determine the offset of the camera model according to the first angle and the fixed offset distance corresponding to the first direction.

In an exemplary embodiment, the fixed offset distance includes at least one of a longitudinal fixed offset distance and a transverse fixed offset distance, and the apparatus further includes:

a calculation module 905, configured to determine a product of the transverse fixed offset distance and a cosine value of the first angle as a transverse offset distance in response to that the fixed offset distance corresponding to the first direction includes the transverse fixed offset distance, the calculation module 905 being configured to determine a product of the longitudinal fixed offset distance and a sine value of the first angle as a longitudinal offset distance in response to that the fixed offset distance corresponding to the first direction includes the longitudinal fixed offset distance; and the determining module 906 is configured to determine the offset of the camera model according to at least one of the transverse offset distance and the longitudinal offset distance.

In an exemplary embodiment, the control module 904 is configured to control, according to the offset, the camera model to move from the first camera position to the second camera position in a specified movement manner, the specified movement manner including any one of a uniform motion, a differential motion, and a smooth damped motion.

In an exemplary embodiment, the obtaining module 903 is configured to obtain a skill offset and a global offset of the camera model, the skill offset being determined according to a control instruction of the directional skill indicator, and the global offset being determined according to at least one camera control instruction of an instruction of dragging a map, an instruction of viewing a minimap, and an instruction of specifying a visual angle of a virtual unit; and the determining module 906 is configured to determine a sum of the skill offset and the global offset as the offset of the camera model.

This application further provides a terminal, including a processor and a memory, the memory storing at least one instruction, the at least one instruction being loaded and executed by the processor to implement the method for displaying a virtual environment picture provided in the foregoing method embodiments. The terminal may be a terminal provided in FIG. 34 below.

Figure 34:
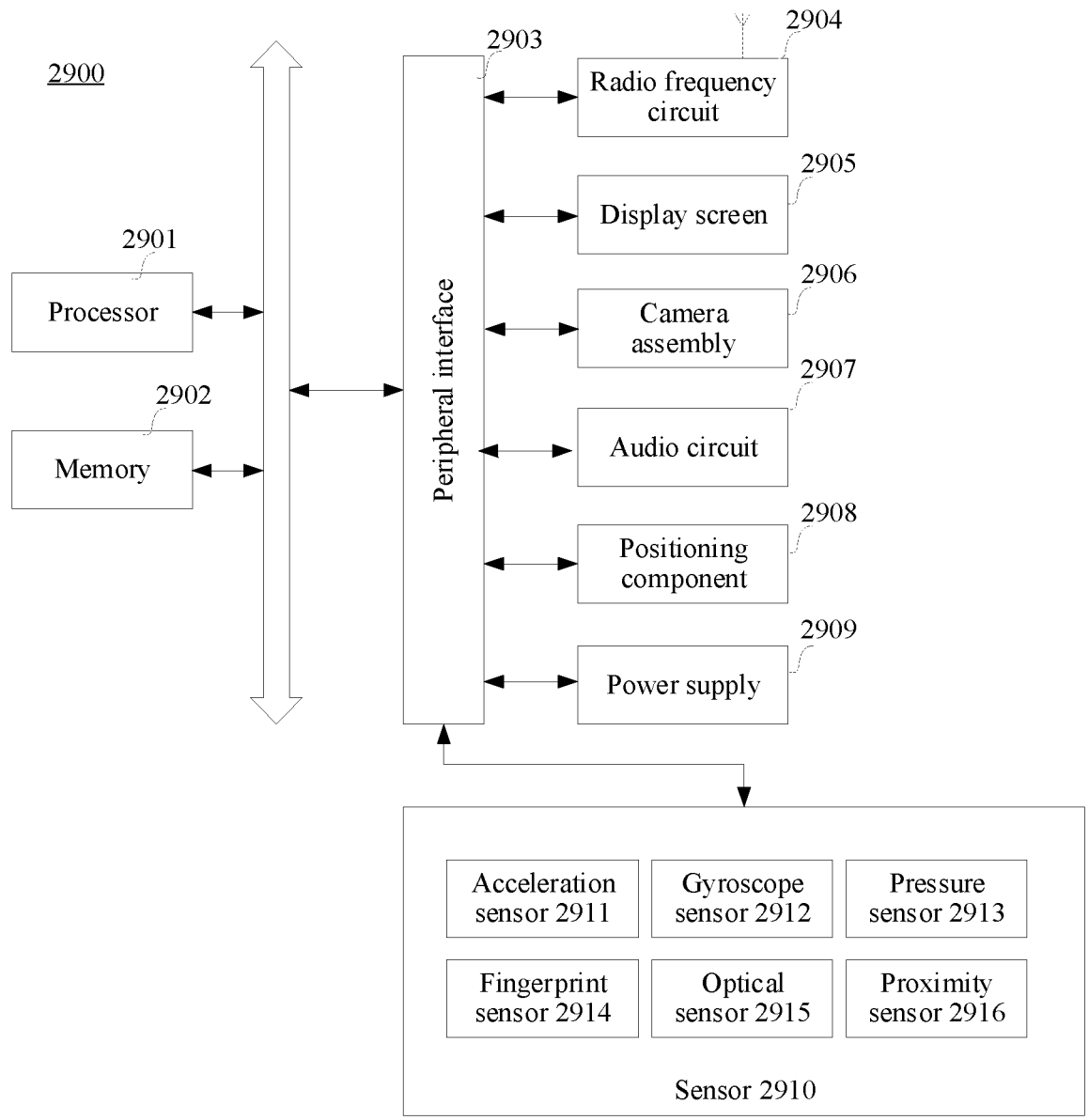
FIG. 34 is a block diagram of a terminal according to an exemplary embodiment of this application.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit FIG. 34 is a structural block diagram of a terminal 2900 according to an exemplary embodiment of this application. The terminal 2900 may be a smartphone, a tablet computer, an MP3 player, an MP4 player, a notebook computer, or a desktop computer. The terminal 2900 may also be referred to as a user equipment, a portable terminal, a laptop terminal, a desktop terminal, or the like.

Generally, the terminal 2900 includes a processor 2901 and a memory 2902.

The processor 2901 may include one or more processing cores, and may be, for example, a 4-core processor or an 8-core processor. The processor 2901 may be implemented by using at least one hardware form of digital signal processor (DSP), a field-programmable gate array (FPGA), and a programmable logic array (PLA). The processor 2901 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 2901 may be integrated with a graphics processing unit (GPU). The GPU is responsible for rendering and drawing content to be displayed by a display screen. In some embodiments, the processor 2901 may further include an artificial intelligence (AI) processor. The AI processor is configured to process a calculation operation related to machine learning.

The memory 2902 may include one or more computer-readable storage media that may be non-transitory. The memory 2902 may further include a high-speed random access memory and a non-volatile memory, for example, one or more disk storage devices or flash storage devices. In some embodiments, the non-transient computer-readable storage medium in the memory 2902 is configured to store at least one instruction, the at least one instruction being configured to be executed by the processor 2901 to implement the method for displaying a virtual environment picture provided in the method embodiments of this application.

In some embodiments, the terminal 2900 may further include: a peripheral interface 2903 and at least one peripheral. The processor 2901, the memory 2902, and the peripheral interface 2903 may be connected by using a bus or a signal cable. Each peripheral may be connected to the peripheral interface 2903 by using a bus, a signal cable, or a circuit board. Specifically, the peripheral includes: at least one of a radio frequency (RF) circuit 2904, a touch display screen 2905, a camera assembly 2906, an audio circuit 2907, a positioning component 2908, and a power supply 2909.

The peripheral interface 2903 may be configured to connect at least one peripheral related to input/output (I/O) to the processor 2901 and the memory 2902. In some embodiments, the processor 2901, the memory 2902, and the peripheral interface 2903 are integrated on the same chip or circuit board. In some other embodiments, any one or two of the processor 2901, the memory 2902, and the peripheral interface 2903 may be implemented on a separate chip or circuit board. This is not limited in this embodiment.

The RF circuit 2904 is configured to receive and transmit an RF signal, also referred to as an electromagnetic signal. The RF circuit 2904 communicates with a communication network and another communications device by using the electromagnetic signal. The RF circuit 2904 converts an electric signal into an electromagnetic signal for transmission, or converts a received electromagnetic signal into an electric signal. Optionally, the RF circuit 2904 includes an antenna system, an RF transceiver, one or more amplifiers, a tuner, an oscillator, a digital signal processor, a codec chip set, a subscriber identity module card, and the like. The RF circuit 2904 may communicate with another terminal by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF 2904 may further include a circuit related to Near-Field Communication (NFC), which is not limited in this application.

The display screen 2905 is configured to display a UI. The UI may include a graph, a text, an icon, a video, and any combination thereof. When the display screen 2905 is a touch display screen, the display screen 2905 is also capable of capturing a touch signal on or above a surface of the display screen 2905. The touch signal may be inputted to the processor 2901 as a control signal for processing. In this case, the display screen 2905 may be further configured to provide a virtual button and/or a virtual keyboard that are/is also referred to as a soft button and/or a soft keyboard. In some embodiments, there may be one display screen 2905 disposed on a front panel of the terminal 2900. In some other embodiments, there may be at least two display screens 2905 respectively disposed on different surfaces of the terminal 2900 or designed in a foldable shape. In still some other embodiments, the display screen 2905 may be a flexible display screen, disposed on a curved surface or a folded surface of the terminal 2900. Even, the display screen 2905 may be further set to have a non-rectangular irregular pattern, that is, a special-shaped screen. The display screen 2905 may be prepared by using materials such as a liquid crystal display (LCD), an organic light-emitting diode (OLED), or the like.

In some embodiments, the computer device 2900 further includes one or more sensors 2910. The one or more sensors 2910 include, but are not limited to, an acceleration sensor 2911, a gyroscope sensor 2912, a pressure sensor 2913, a fingerprint sensor 2914, an optical sensor 2915, and a proximity sensor 2916.

The pressure sensor 2913 may be disposed on a side frame of the computer device 2900 and/or a lower layer of the touch display screen 2905. When the pressure sensor 2913 is disposed at the side frame of the computer device 2900, a holding signal of the user on the computer device 2900 may be detected, and left/right hand identification and a quick operation may be performed according to the holding signal. When the pressure sensor 2913 is disposed at the lower layer of the touch display screen 2905, an operable control on the UI interface can be controlled according to a pressure operation of the user on the touch display screen 2905. The operable control includes at least one of a button control, a scroll-bar control, an icon control, and a menu control.

A person skilled in the art may understand that the structure shown in FIG. 34 does not constitute a limitation to the terminal 2900, and the terminal may include more or fewer components than those shown in the figure, or some components may be combined, or a different component deployment may be used.

The memory further includes one or more programs. The one or more programs are stored in the memory. The one or more programs include a program for performing the method for displaying a virtual environment picture provided in the embodiments of this application.

This application further provides a non-transitory computer-readable storage medium, the storage medium storing at least one instruction, the at least one instruction being loaded and executed by a processor to implement the method for displaying a virtual environment picture according to the foregoing method embodiments.

This application provides a computer program product or a computer program. The computer program product or the computer program includes computer instructions, and the computer instructions are stored in a computer-readable storage medium. A processor of the computer device reads the computer instructions from the computer-readable storage medium and executes the computer instructions to cause the computer device to perform the method for displaying a virtual environment picture provided in the foregoing method embodiments.

What is claimed is:

1. A method for displaying a virtual environment picture performed by a computer device, the method comprising:
displaying a first virtual environment picture, the first virtual environment picture being a picture obtained by observing a virtual environment by using a first observation position as an observation center, the first virtual environment picture displaying a master virtual character located in the virtual environment;
displaying, in response to receiving a first directional instruction generated by a first directional operation, a directional skill indicator pointing to a first direction, the directional skill indicator being a directional identifier that uses a position of the master virtual character as a starting point and that points to the first direction; and
in accordance with a determination that a length of the directional skill indicator is greater than a distance threshold in the first virtual environment picture, displaying a second virtual environment picture, the second virtual environment picture being a picture obtained by observing the virtual environment by using a second observation position as the observation center, the second virtual environment picture comprising the directional skill indicator, and the second observation position being in the first direction of the first observation position or in a surrounding region in the first direction.

2. The method according to claim 1, wherein the distance threshold is a visual field threshold that uses the position of the master virtual character as a starting point in the first virtual environment picture and that is in the first direction.

3. The method according to claim 1, wherein the first virtual environment picture and the second virtual environment picture are pictures captured by a camera model disposed in the virtual environment, and the observation center is an intersection of a ray emitted from a position of the camera model along an observing direction and the virtual environment; and
the displaying the second virtual environment picture comprises:
obtaining an offset of the camera model in response to that the length of the directional skill indicator is greater than the distance threshold, the offset being used for determining a moving direction and a moving distance of the camera model;
controlling, according to the offset, the camera model to move from a first camera position to a second camera position, an observation center of the camera model at the first camera position being the first observation position, and an observation center of the camera model at the second camera position being the second observation position; and
displaying the second virtual environment picture according to the camera model at the second camera position, the second virtual environment picture comprising the directional skill indicator.

4. The method according to claim 3, wherein the offset is calculated according to a visual field determining box, and the visual field determining box is configured to represent a visual field of the camera model; and
the obtaining an offset of the camera model in response to that the length of the directional skill indicator is greater than the distance threshold comprises:
obtaining the offset of the camera model in response to that the directional skill indicator is at least partially outside a first visual field determining box and according to a distance by which the directional skill indicator is at least partially outside the first visual field determining box, the first visual field determining box being a visual field determining box with the first observation position as a center.

5. The method according to claim 4, wherein the obtaining the offset of the camera model in response to that the directional skill indicator is at least partially outside a first visual field determining box and according to a distance by which the directional skill indicator is at least partially outside the first visual field determining box comprises:
obtaining an offset calculation point of the directional skill indicator, the offset calculation point being determined based on an end of the directional skill indicator;
calculating, in response to that the offset calculation point is located outside the first visual field determining box, an exceeding distance by which the offset calculation point is at least partially outside the first visual field determining box; and
determining the exceeding distance and the first direction as the moving distance and the moving direction of the offset of the camera model.

6. The method according to claim 5, further comprising:
displaying, in response to receiving a second directional instruction generated according to a second directional operation, that the directional skill indicator changes from pointing to the first direction to pointing to a second direction;
controlling, in response to that the offset calculation point of the directional skill indicator that points to the second direction is located inside of a second visual field determining box, the camera model to move toward a default camera position until reach a third camera position, the second visual field determining box being a visual field determining box with the second observation position as a center point, and the default camera position being a position of the camera model in the virtual environment when the camera model is not offset; and
displaying a third virtual environment picture according to the camera model at the third camera position, the third virtual environment picture comprising the directional skill indicator,
an observation center of the camera model at the third camera position being a third observation position, the offset calculation point of the directional skill indicator in the third virtual environment picture being located on a side line of a third visual field determining box, the third visual field determining box being a visual field determining box with the third observation position as a center point.

7. The method according to claim 3, wherein the offset is calculated according to the first direction; and
the obtaining an offset of the camera model in response to that the length of the directional skill indicator is greater than the distance threshold comprises:

obtaining the offset of the camera model according to the first direction and a fixed offset distance in response to that the length of the directional skill indicator is greater than the distance threshold, the fixed offset distance being a predetermined value.

8. The method according to claim 7, wherein the obtaining the offset of the camera model according to the first direction and a fixed offset distance comprises:

obtaining a first angle between the first direction and an x-axis of a ground coordinate system, the ground coordinate system being a rectangular coordinate system that uses the position of the master virtual character as an origin and that is established according to the observing direction of the camera model and parallel to a ground;

determining the fixed offset distance corresponding to the first direction according to a quadrant or a coordinate axis at which the first direction is located in the ground coordinate system; and determining the offset of the camera model according to the first angle and the fixed offset distance corresponding to the first direction.

9. The method according to claim 8, wherein the fixed offset distance comprises at least one of a longitudinal fixed offset distance and a transverse fixed offset distance; and the determining the offset of the camera model according to the first angle and the fixed offset distance corresponding to the first direction comprises:

determining a product of the transverse fixed offset distance and a cosine value of the first angle as a transverse offset distance in response to that the fixed offset distance corresponding to the first direction comprises the transverse fixed offset distance;

determining a product of the longitudinal fixed offset distance and a sine value of the first angle as a longitudinal offset distance in response to that the fixed offset distance corresponding to the first direction comprises the longitudinal fixed offset distance; and determining the offset of the camera model according to at least one of the transverse offset distance and the longitudinal offset distance.

10. The method according to claim 3, wherein the controlling, according to the offset, the camera model to move from a first camera position to a second camera position comprises:

controlling, according to the offset, the camera model to move from the first camera position to the second camera position in a specified movement manner, the specified movement manner comprising a uniform motion, a differential motion, or a smooth damped motion.

11. The method according to claim 3, wherein the obtaining an offset of the camera model further comprises:

obtaining a skill offset and a global offset of the camera model, the skill offset being determined according to a control instruction of the directional skill indicator, and the global offset being determined according to at least one camera control instruction of an instruction of dragging a map, an instruction of viewing a minimap, and an instruction of specifying a visual angle of a virtual unit; and determining a sum of the skill offset and the global offset as the offset of the camera model.

12. A computer device, comprising a processor and a memory, the memory storing at least one program, the at least one program being loaded and executed by the processor to perform a plurality of operations including:

displaying a first virtual environment picture, the first virtual environment picture being a picture obtained by observing a virtual environment by using a first observation position as an observation center, the first virtual environment picture displaying a master virtual character located in the virtual environment;

displaying, in response to receiving a first directional instruction generated by a first directional operation, a directional skill indicator pointing to a first direction, the directional skill indicator being a directional identifier that uses a position of the master virtual character as a starting point and that points to the first direction; and in accordance with a determination that a length of the directional skill indicator is greater than a distance threshold in the first virtual environment picture, displaying a second virtual environment picture, the second virtual environment picture being a picture obtained by observing the virtual environment by using a second observation position as an observation center, the second virtual environment picture comprising the directional skill indicator, and the second observation position being in the first direction of the first observation position or in a surrounding region in the first direction.

13. The computer device according to claim 12, wherein the distance threshold is a visual field threshold that uses the position of the master virtual character as a starting point in the first virtual environment picture and that is in the first direction.

14. The computer device according to claim 12, wherein the first virtual environment picture and the second virtual environment picture are pictures captured by a camera model disposed in the virtual environment, and the observation center is an intersection of a ray emitted from a position of the camera model along an observing direction and the virtual environment; and the displaying the second virtual environment picture comprises:

obtaining an offset of the camera model in response to that the length of the directional skill indicator is greater than the distance threshold, the offset being used for determining a moving direction and a moving distance of the camera model;

controlling, according to the offset, the camera model to move from a first camera position to a second camera position, an observation center of the camera model at the first camera position being the first observation position, and an observation center of the camera model at the second camera position being the second observation position; and displaying the second virtual environment picture according to the camera model at the second camera position, the second virtual environment picture comprising the directional skill indicator.

15. The computer device according to claim 14, wherein the offset is calculated according to a visual field determining box, and the visual field determining box is configured to represent a visual field of the camera model; and the obtaining an offset of the camera model in response to that the length of the directional skill indicator is greater than the distance threshold comprises:

obtaining the offset of the camera model in response to that the directional skill indicator is at least partially outside a first visual field determining box and according to a distance by which the directional skill indicator is at least partially outside the first visual field determining box, the first visual field determining box being a visual field determining box with the first observation position as a center.

16. The computer device according to claim 14, wherein the offset is calculated according to the first direction; and
the obtaining an offset of the camera model in response to that the length of the directional skill indicator is greater than the distance threshold comprises:
obtaining the offset of the camera model according to the first direction and a fixed offset distance in response to that the length of the directional skill indicator is greater than the distance threshold, the fixed offset distance being a predetermined value.

17. The computer device according to claim 14, wherein the controlling, according to the offset, the camera model to move from a first camera position to a second camera position comprises:
controlling, according to the offset, the camera model to move from the first camera position to the second camera position in a specified movement manner, the specified movement manner comprising any one of a uniform motion, a differential motion, and a smooth damped motion.

18. The computer device according to claim 14, wherein the obtaining an offset of the camera model further comprises:
obtaining a skill offset and a global offset of the camera model, the skill offset being determined according to a control instruction of the directional skill indicator, and the global offset being determined according to at least one camera control instruction of an instruction of dragging a map, an instruction of viewing a minimap, and an instruction of specifying a visual angle of a virtual unit; and
determining a sum of the skill offset and the global offset as the offset of the camera model.

19. A non-transitory computer-readable storage medium, storing at least one program, the at least one program being loaded and executed by a processor of a computer device to perform a plurality of operations including:
displaying a first virtual environment picture, the first virtual environment picture being a picture obtained by observing a virtual environment by using a first observation position as an observation center, the first virtual environment picture displaying a master virtual character located in the virtual environment;
displaying, in response to receiving a first directional instruction generated by a first directional operation, a directional skill indicator pointing to a first direction, the directional skill indicator being a directional identifier that uses a position of the master virtual character as a starting point and that points to the first direction; and
in accordance with a determination that a length of the directional skill indicator is greater than a distance threshold in the first virtual environment picture, displaying a second virtual environment picture, the second virtual environment picture being a picture obtained by observing the virtual environment by using a second observation position as an observation center, the second virtual environment picture comprising the directional skill indicator, and the second observation position being in the first direction of the first observation position or in a surrounding region in the first direction.

20. The non-transitory computer-readable storage medium according to claim 19, wherein the first virtual environment picture and the second virtual environment picture are pictures captured by a camera model disposed in the virtual environment, and the observation center is an intersection of a ray emitted from a position of the camera model along an observing direction and the virtual environment; and
the displaying the second virtual environment picture comprises:
obtaining an offset of the camera model in response to that the length of the directional skill indicator is greater than the distance threshold, the offset being used for determining a moving direction and a moving distance of the camera model;
controlling, according to the offset, the camera model to move from a first camera position to a second camera position, an observation center of the camera model at the first camera position being the first observation position, and an observation center of the camera model at the second camera position being the second observation position; and
displaying the second virtual environment picture according to the camera model at the second camera position, the second virtual environment picture comprising the directional skill indicator.

* * * * *